US008417644B2

(12) United States Patent
Ferguson et al.

(10) Patent No.: US 8,417,644 B2
(45) Date of Patent: Apr. 9, 2013

(54) METHOD AND SYSTEM FOR NETWORK TRANSACTION MANAGEMENT

(75) Inventors: Hill Ferguson, San Francisco, CA (US); Blake Hayward, San Francisco, CA (US); Ramakrishna Satyavolu, Fremont, CA (US)

(73) Assignee: Yodlee.com, Inc., Redwood City, CA (US)

( * ) Notice: Subject to any disclaimer, the term of this patent is extended or adjusted under 35 U.S.C. 154(b) by 1269 days.

(21) Appl. No.: 11/107,274

(22) Filed: Apr. 15, 2005

(65) Prior Publication Data

US 2005/0203844 A1 Sep. 15, 2005

Related U.S. Application Data

(60) Continuation of application No. 11/027,669, filed on Dec. 29, 2004, which is a continuation-in-part of application No. 09/737,404, filed on Dec. 14, 2000, which is a division of application No. 09/323,598, filed on Jun. 1, 1999, now Pat. No. 6,199, 077.

(60) Provisional application No. 60/533,692, filed on Dec. 31, 2003.

(51) Int. Cl.
*G06Q 40/00* (2012.01)
*G06F 17/00* (2006.01)

(52) U.S. Cl.
USPC ............................................. 705/76; 705/1.1

(58) Field of Classification Search ...................... 705/40
See application file for complete search history.

(56) References Cited

U.S. PATENT DOCUMENTS

| 4,833,607 | A | * | 5/1989 | Dethloff et al. ............. 705/14.13 |
| 5,383,113 | A | * | 1/1995 | Kight et al. ..................... 705/40 |
| 5,465,206 | A | * | 11/1995 | Hilt et al. ........................ 705/40 |
| 5,483,445 | A | * | 1/1996 | Pickering ....................... 705/40 |
| 5,699,528 | A | * | 12/1997 | Hogan ............................ 705/40 |
| 6,014,635 | A | * | 1/2000 | Harris et al. ............... 705/14.17 |
| 6,199,077 | B1 | | 3/2001 | Inala et al. |
| 7,089,208 | B1 | * | 8/2006 | Levchin et al. ................ 705/39 |

OTHER PUBLICATIONS

Bill Orr Billers will call the shots in bill presentment. American Bankers Association. ABA Banking Journal, New York: Apr. 1998. vol. 90, Iss. 4; p. 70, 1 pgs.*
U.S. Appl. No. 11/027,669, Hill Ferguson et al., Priority Claim.
U.S. Appl. No. 09/737,404, Suman Kumar Inala et al., Priority Claim.
U.S. Appl. No. 60/533,692, Hill Ferguson et al., Priority Claim.

* cited by examiner

*Primary Examiner* — Calvin L Hewitt, II
*Assistant Examiner* — Zeshan Qayyum
(74) *Attorney, Agent, or Firm* — Donald R. Boys; Central Coast Patent Agency, Inc.

(57) ABSTRACT

A system for transacting in a network includes a service broker connected to the network, having access to necessary credentials, a service provider connected to the network, requiring credentials for transacting in regard to a client, and a client station connected to the network. A client using the client station sends a preliminary request for a transaction to the service broker, which initiates, at the appropriate time, the transaction for the client by a request to the service provider, accompanied by the appropriate credentials, and the service broker monitors the service provider after the write request for an acknowledgement of the request.

23 Claims, 13 Drawing Sheets

METHOD AND SYSTEM FOR NETWORK TRANSACTION MANAGEMENT

CROSS-REFERENCE TO RELATED DOCUMENTS

The present application is a continuation of U.S. patent application Ser. No. 11/027,669, filed on Dec. 29, 2004, which is a CIP to U.S. patent application Ser. No. 09/737,404, entitled "Method and Apparatus for Obtaining and Presenting WEB Summaries to Users", filed on Dec. 14, 2000, which is a divisional to a U.S. patent application Ser. No. 09/323,598, entitled "Method and Apparatus for Providing and Maintaining a User-Interactive Portal System Accessible via Internet or other Switched-Packet-Network" filed on Jun. 1, 1999, now issued as U.S. Pat. No. 6,199,077. The present invention also claims priority to a U.S. provisional patent application Ser. No. 60/533,692, entitled "Method and System for Verifying Web-based Communication with a Third-Party Internet-based service" filed on Dec. 31, 2003. The entire disclosure of the prior cases described above is incorporated in the present application at least by reference.

BACKGROUND OF THE INVENTION (a) Field of the Invention

Embodiments of the present invention relate to the field of network communication. More particularly, embodiments of the present invention relate generally to verifying web-based communication.

(B) Related Art

The Internet includes a set of computer networks that follow a particular communication protocol to communicate with each other. The Internet is comprised of high speed data communication lines between major nodes or host computers. These nodes consist of thousands of commercial, government, educational, and other computer systems that route data and communication between users, content providers, third-party Internet-based services, access providers, etc.

Through the Internet, a new range of services for users is possible. Because of the world-wide reach of Internet communication, users from around the world are able to access and utilize services that are provided over the Internet. For example, bill payment on-line has the potential of making the chore of paying monthly bills simpler, easier, and more satisfying than the traditional method of paying bills in person or through the mail. In one case, a direct-billing model is provided over the Internet for users to pay bills online directly to billers. In this case, individual billers have developed their own web sites for clients to pay bills electronically. In the direct billing model, a biller (e.g., a utility company) allows their customers to pay bills electronically over the Internet.

These new services are based upon dependable communication between a user and a third-party Internet-based service providing the services. For instance, before the customer can utilize the on-line billing services, the customer needs to set up an account with the direct biller through the Internet. Many times, this involves having the customer interact with a direct biller web site in order to send a request to the direct billing web site to apply for an account. In this process, information is passed from the customer to the direct biller to set up the direct billing services. This information may include customer name, address, bank account from which funds will be electronically drawn upon to pay the bills, etc. After receipt of the request, the direct biller checks the information before granting authorization for the customer to pay bills on-line. For example, the direct biller needs to verify that the bank account is a valid bank account from which funds can be drawn.

However, Internet-based communication can be undependable. This is especially the case for write operations (e.g., submitting data) to the third-party Internet-based service. Read operations are readily verifiable in a real-time mode, since the returned data is viewable. In the present case, in the process of setting up an account, communication between a customer and a direct biller is a fluid process that can be routed through different communication paths through varying routers, switches, and hubs depending on availability. That is, a communication path between a customer and a third-party Internet-based service is not static. As such, connections between a user and a third-party Internet-based service can be dropped for many reasons at any time. The dropped connection can occur at any point along the communication path, for example, at the client's Internet service provider, or the server associated with the third-party Internet-based service, or at any point in between. Moreover, quick diagnosis of the problem may not be detectable.

In particular, for a customer trying to set up an account with a direct biller in order to pay bills on-line, two problems may occur. First, verification of receipt of the request may be difficult to determine, especially when communication between the customer and the direct biller is dropped sometime during the transaction. For instance, even though the direct biller did receive the request and sent a verification response, if the communication path went down, the customer would not receive the verification and would not know if the direct biller did receive the request.

Secondly, even after verification of receipt of the request is determined, the direct biller must still authorize the customer to use the account. In this case, the direct biller may advise the customer to wait for a period of time before coming back to the direct biller's web site to determine if the account is activated. As such, the customer must periodically go back and check with the direct biller to verify that the account has been authorized, thereby allowing the customer to utilize the direct billing services. This process can be time consuming and tedious for the customer making the process of setting up the account undesirable to the user.

So there are in Internet services, such as on-line bill payment, many shortcomings and problems for an ordinary person intent on paying bills on-line. What is clearly needed is a consolidated system for bill paying that is inherently reliable, and minimizes interaction time and effort for the payer.

SUMMARY OF THE INVENTION

In an embodiment of the invention a system for transacting in a network is provided, comprising a service broker connected to the network, having access to necessary credentials, a service provider connected to the network, requiring credentials for transacting in regard to a client, and a client station connected to the network. A client using the client station sends a preliminary request for a transaction to the service broker, which initiates, at the appropriate time, the transaction for the client by a request to the service provider, accompanied by the appropriate credentials, and the service broker monitors the service provider after the write request for an acknowledgement of the request.

In one embodiment the service broker, through data gathering activity, retrieves and stores navigational information regarding the service provider, which information is used in the monitoring for acknowledgement. Also in an embodiment, after a preprogrammed interval following the write request, the service broker notifies the client regarding the occurrence of acknowledgement or of the failure of the request. In some embodiments, after a preprogrammed interval, having not received the acknowledgement, determines the request was not acted upon by the service provider, and repeats the request on behalf of the client.

In some embodiments of the system service provider is a billing facility, and the request by the client is a request for a transaction regarding a billing by the billing facility. In some cases the request is to pay a bill on behalf of the client, and in some cases the request is to set the billing account specified by the client to be paid automatically each billing cycle.

In some embodiments of the system the service broker maintains a list of service providers associated with the client, and other lists associated with other clients, and provides to individual clients regularly-updated information regarding the status of services for individual clients, with a mechanism for the individual client to select service providers and make preliminary requests to the service broker for initiating transactions with the selected service providers. Individual ones of the service providers may be billing facilities, and the lists provided by the service broker may comprise billing status, and at least some of the preliminary requests made by clients may be for transactions with individual ones of the billing facilities in regard to bills associated with the clients.

In some cases the service broker, after initiating a transaction for a client, monitors the service provider for acknowledgement. Also in some cases the service broker, after initiating a transaction for a client, monitors the service provider for confirmation of completion, or error in completion.

In some cases the service broker gathers tracking information for observed state from the service provider, and in some cases the service broker, through data gathering activity, gathers information for the lists provided to clients, and also through the data gathering activity retrieves and stores navigational information regarding the service providers, which information is used in the monitoring for acknowledgement.

In another aspect of the invention a method for transacting in a network is provided, comprising the steps of (a) sending a preliminary request for a transaction to a service broker by a client using a network-connected client station; (b) initiating, at the appropriate time, the request for a transaction by the service broker by a request to a service provider, including with the request appropriate credentials stored by the service broker; and (c) monitoring the service provider by the service broker for any acknowledgement of the request for a transaction following the write request.

In some embodiment of the method the service broker, through data gathering activity, retrieves and stores navigational information regarding the service provider, which information is used in the monitoring for acknowledgement. In other embodiments, after a preprogrammed interval following the request, the service broker notifies the client regarding the occurrence of acknowledgement. In still other embodiments the service broker, after a preprogrammed interval, having not received the acknowledgement, determines the request was not acted upon by the service provider, and repeats the request on behalf of the client.

In some embodiments the service provider is a billing facility, and the request by the client is a request for a transaction regarding a billing by the billing facility, and the request may be to pay a bill on behalf of the client. Also in some embodiments the service broker maintains a list of service providers associated with the client, and other lists associated with other clients, and provides to individual clients regularly-updated information regarding the status of services for individual clients, with a mechanism for the individual client to select service providers and make preliminary requests to the service broker for initiating transactions with the selected service providers.

In some embodiments of the method individual ones of the service providers are billing facilities, the lists provided by the service broker comprise billing status, and at least some of the preliminary requests made by clients are for transactions with individual ones of the billing facilities in regard to bills associated with the clients. In some cases, the service broker, after initiating a transaction for a client, monitors the service provider for acknowledgement. In other embodiments the service broker, through data gathering activity, may gather information for the lists provided to clients, and also through the data gathering activity may retrieve and store navigational information regarding the service providers, which information is used in the monitoring for acknowledgement.

BRIEF DESCRIPTION OF THE DRAWING FIGURES

DETAILED DESCRIPTION

Figure 1:
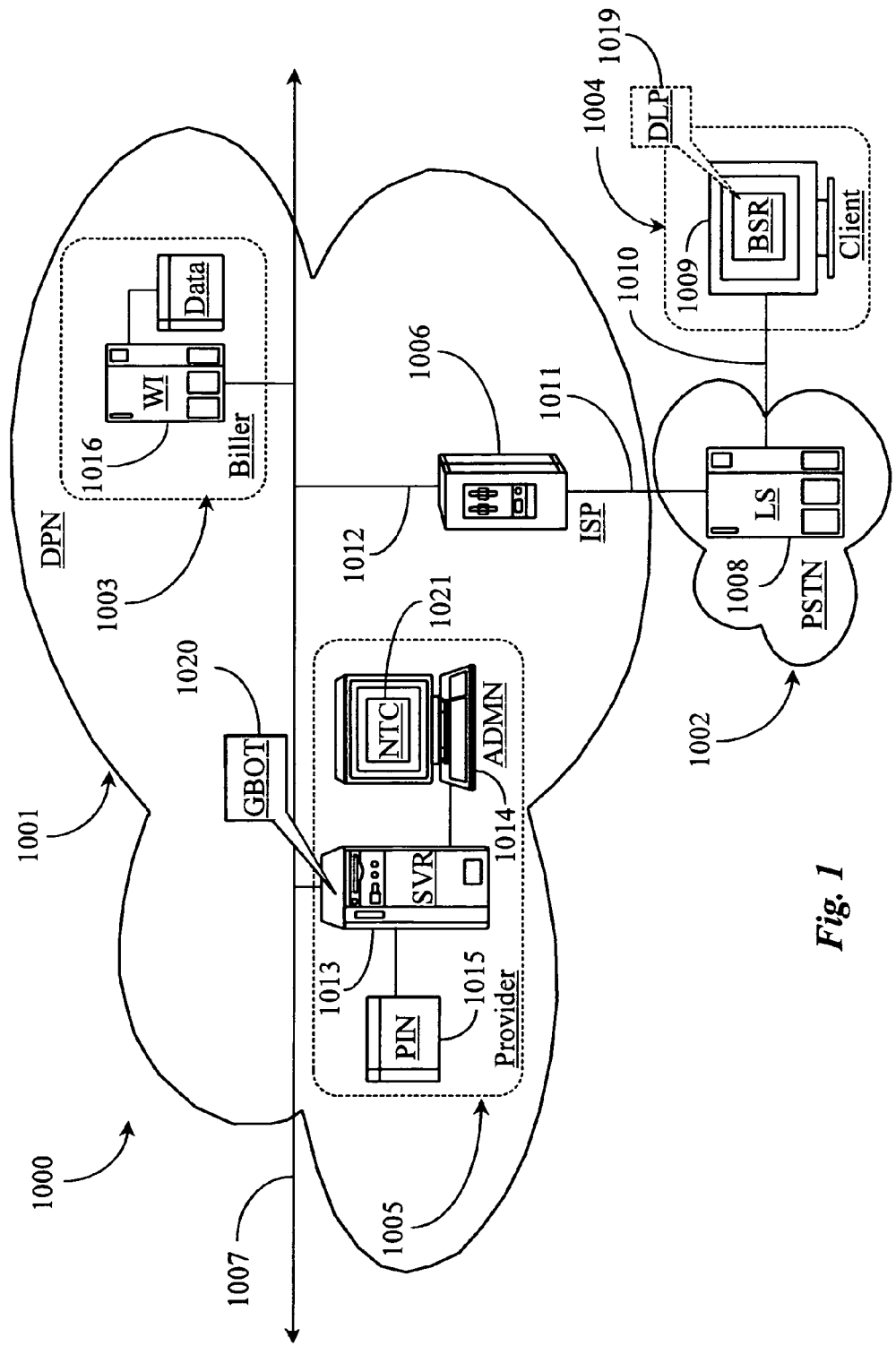
FIG. 1 is an architectural overview of a data network over which credential-based network linking between a client and service is practiced according to an embodiment of the present invention.

FIG. 1 is an architectural overview 1000 of a data network over which credential-based network linking between a client and service is practiced according to an embodiment of the present invention. Architecture 1000 includes a data-packet-network (DPN) 1001, which may be a wide-area-network (WAN) such as the well-known Internet network. DPN 1001 may also be a corporate WAN or Intranet, a metropolitan-area-network WAN, or a private WAN. In a preferred embodiment DPN 1001 is the Internet network owing to characteristics of large geographic coverage and high public access. DPN 1001 may be referred to also in this specification as Internet 1001.

In accordance with a preferred embodiment, Internet 1001 is typically, although not exclusively accessed through a public-switched-telephone-network (PSTN) 1002. PSTN 1002 may be another type of telephony network including a wireless carrier network without departing from the spirit and scope of the present invention. In this example, there are three interacting parties illustrated herein as a service provider 1005, a direct billing party 1003, and a client station 1004.

Internet 1001 has a network backbone 1007 illustrated as extending there through. Backbone 1007 represents all of the lines equipment and connection points that make up the larger network as a whole. Therefore, it will be appreciated that there are no geographic limits to the practice of the present invention. Both billing party 1003 and service provider 1005 have Internet domains represented logically herein by dotted rectangles enclosing each party.

In Internet 1001, billing party 1003 represents any direct billing party that may be accessible through an on-line Web interface. As such, a Web interface (WI) 1016 is illustrated within the domain of party 1003 and has connection to backbone 1007 for access and communication. WI 1016 may be a server adapted to enable clients such as client 1004 to access account information and pay bills. Client 1004 may be considered a client of billing party 1003 in this example. WI 1016 as a data repository associated therewith and labeled herein Data. Such a repository may hold client data, account data, payment history, and other like data categories maintained on behalf of the clients and managed for the purpose of business interaction in general.

Client station 1004, also referred to herein simply as client 1004, has a client networking device 1009 illustrated therein, which may be any type of network-capable communication device such as a computer, a personal digital assistant (PDA), a network capable telephony device, and so on. In this example, a simple computer icon is used to illustrate a device capable of accessing WI 1016 and of interacting therewith for the purpose of conducting business including payment of bills associated with a client account.

In his example, client 1004, or more particularly device 1009 has a telephony connection 1010 to a local telephone switch (LS) 1008 within PSTN 1002. Switch 1008 bridges client 1004 to an Internet Service Provider (ISP) 1006 via a telephony trunk 1011. ISP 1006 may be assumed to contain all of the equipment including a connection server for enabling Internet access for the client. ISP 1006 has connection to backbone 1007 via an Internet access line 1012. In this way client 1004, operating device 1009 running a network browser application (BSR) may access WI 1016 through, in this case, a dial-up connection through ISP 1006. Other network connection types may also be used by client 1004 to access WI 1016 without departing from the spirit and scope of the present invention. Integrated Services Digital Connection (ISDN), Digital Subscriber Line (DSL), cable modem, and other known methods of connection may apply is some embodiments.

Service provider 1005 is adapted to provide services to client 1004 that have relation to aiding client 1004 to manage accounts and to pay bills wit respect to direct billing party 1003 and other direct billing parties similar to party 1003 that the client may have subscription to. Provider 1005 has a server (SVR) 1013 illustrated therein as having connection to backbone 1007 for access and communication. Server 1013 may be a Portal server wherein information is maintained on behalf of client 1004 by way of interactive Web page or other form of network display. Provider 1005 is adapted in a preferred embodiment to help client 1003 to conduct business with party 1003 among other parties in a way that reduces work required of the client.

For example, server 1013 has connection to a data repository 1015 adapted to store client passwords and personal identification numbers (PINs) used typically to enable secure access to WI 1016 over the network. Secure Socket Layer and other security protocols may also apply. In a preferred embodiment, provider 1005 is able to access WI 1016 on behalf of client 1004 using login and password information stored in repository 1015. Provider 1005 has an administrator (ADMN) computing station 1014 provided therein and connected to server 1013 through a local-area-network (LAN) or other network or direct-link connection. Station 1014 may be a desktop computer. There may also be other ADMN station like station 1014 connected to server 1013 without departing from the spirit and scope of the present invention. The inventor illustrate only one such station and deems the illustration sufficient for the purpose of explaining the present invention.

Station 1014 has a software building application termed, in this example, a navigation template creator (NTC) 1012 installed thereon and executable there from. NTC 1021 is adapted to enable an administrator or other knowledge worker or service worker to create an instruction or instruction set in template form that, once created, can be used to direct a network-capable node running a browser application to navigate to another network node and to interact with that node according to existing node protocols and business rules of the host of the node. For example, such a navigation template can be used to direct and to provide instruction to client device 1009 for navigation to and for interaction with services available to client 1009 through WI 1016.

In one embodiment of the invention, a navigation template created by NTC 1021 may also be used by service provider 1005 to obtain information from a third-party Web site like WI 1016 on behalf of a client using the client-supplied login and password independently from any client involvement. This may be accomplished by a software application termed gathering agent or gathering bot (GBOT) 1020 illustrated herein as installed on server 1013 and executable there from. GBOT 1020 is a software instance capable of automated and scheduled network navigation and data gathering independent of an operator and may be automated per scheduling to access network nodes such as WI 1016 using a navigation template and provided or accessible security data and any task-performance data that may be supplied by a client.

In one embodiment GBOT 1020 accepts extensible Markup Language (XML) based instruction including metadata for navigating to Universal Resource Locators (URL), which may be Web sites or other displayed forms including internal system path information for accessing passwords and PINs for use in automated login to the site or sites having instruction provided in or with a navigation template. Using this technology, which is known to the inventor, provider 1005 may access sites on behalf of clients and gather information from those sites, the navigating agent emulating the client. Passwords, PINs and any other login or secure-access codes are kept encrypted in repository 1015 and are decrypted only to an extent necessary for logging in to a client site. Likewise, provider 1005 may maintain additional client secure data such as source account information required to pay bills online, credit card information, pass phrases, and the like required normally by the client to interact with secure sites.

However, as described in the background section above, the technology may, in some cases be limited by design to provide indirect bill payment services, account summary generation, and limited automated interaction capability on behalf of clients. In current art without benefit of the present invention, provider 1005 may be able to aggregate client information from several sites analogous to billing 1003 and provide that information in one location accessible to client 1004, for example, client 1004 then could elect to have provider 1005 pay bills on behalf of client 1004 is a general way without allowing for more in depth interactions that often accompany a direct-billing environment. Summaries of account information may be gathered and prepared for a client including balance information and other information that may be acquired by screen scraping.

In a preferred embodiment of the present invention, provider 1005 is further enabled to package created navigation instruction, secure access data, form population data, source account information, and execution instruction into a portable and downloadable software executable illustrated herein as a deep-linking plug-in (DLP) 1019 installed on network-capable device 1009, preferably transparently, to a client browser application (BSR). DLP 1019 may be Java-enabled for remote execution or may be of the form of another executable program language that enables triggered and/or scheduled execution and task implementation.

In this way, provider 1005 may enable client station 1009 to automatically and transparently forge a credential-based secure network connection directly to WI 1016, for example, in order to pay a bill or perform other account-related transactions according to provided instruction and data included in plug-in 1019. A credential-based network link, termed a deep link by the inventors may be enabled for a single activity like paying a bill, or for more than one activity such as paying a bill and then changing source account data or perhaps, updating payment history and then paying a bill.

Plug-in 1019 may provide a single deep-link to a direct billing parties Web interface, or more than one deep-link, each to a separate billing party site. A deep-link may be established and executed in the background transparently to a client without causing an interruption in a link established between a client like client 1004 and provider 1005. In this way, provider 1005 may still aggregate Web sites and information for client 1004 presenting such information in a single location accessible to the client, which may also include actionable options regarding functions, a client has setup with those sites such as paying bills. However instead of forging separate links between provider 1005 and each client-registered site or establishing links by proxy between the client, provider, and client-registered site, the client is enabled to establish one or more deep links directly to the client-registered sites transparently without requiring login procedures, manual form population, or other manual navigation functions normally required when interacting with a billing interface.

The benefits of deep-linking are apparent to one with skill in the art of network services in that for many clients serviced simultaneously, server 1013 does not have to maintain as many server connections. Similarly, programs that provide bill payment confirmation, acceptance of new payment information and so on may be packaged with DLP 1019 and do not have to be run on server 1013. Likewise, much work related to manual navigation and form or electronic interface field population can be reduced or eliminated altogether for a client using the service of the present invention.

One with skill in the art of bill pay services will recognize that in the event of further necessary action not anticipated by template, the client already has a direct connection to a billing party site and can, at any time or upon prompt or notification, establish the visibility of the transparent link by calling up an additional or second browser window whereupon normal direct manual navigation and interaction between the client and the Web interface may be carried out and the interaction results fully visualized.

In a preferred embodiment of the present invention client 1004, having an account set up with provider 1005 first establishes a service account with a third-party service like billing party 1003 and then provides certain information to provider 1005 when registering the service account for bill-pay services. The information may include but not limited to login password, PIN, URL data, source payment account data, and any secure information related to those source accounts and, perhaps, which accounts may be used to pay which bills from the third-party service. Some information may be gathered from the service that client 1004 is registering with the provider. Minimally, client 1004 need only supply provider 1005 with a URL to a resource maintained, in this case in WI 1016 and the secure password information enabling login and service access. Identification and other data related to a money or financial account owned by the client and approved for paying certain bills from may be provided in some cases to service 1003 or alternatively to provider 1005 depending on the nature of the transaction process.

Provider 1005 maintains secure information for client 1004 and creates one or more navigation templates based in part on initial client information such as main URL and in part on what data can be gathered from the site in terms of client functions that the site allows to be performed and those navigational sequences and form-population requirements. Provider 1005 may maintain a personal Web page for client 1004 where the clients aggregated site information and summary information may be presented along with actionable options associated with each listed party such as "pay now", "schedule payment", "view balance" and so on. These actionable items may be triggers for a client connected through a secure network connection to initiate a process of receiving one or more DLPs 1019 that are pre-created.

In one embodiment, client 1004 may access SVR 1013 and select one or more billing parties and execute a pay now option. Upon execution thereof, DLP 1019 is automatically downloaded and is automatically installed as a plug-in to the browser of client 1004. Once installed, DLP 1019 automatically executes, in one embodiment, and initiates a deep link to a first billing party and uses client-provided password and PIN information to gain access to, in this case, a bill payment page or Web form. The instruction set provided in DLP 1019 provides the required logic for automatically populating the billing parties electronic payment form and automatically executes or submits the form once populated with the correct data.

The form population data and secure login information is made part of the plug-in and resides in encrypted format until it is used. After a transaction is complete, DLP 1019 may provide some form of client notification that a particular transaction was accepted or rejected at which point the client may intervene, for example, in case of rejection and manually take over the deep link to perform any other tasks. If DLP 1019 is programmed to navigate and perform tasks at more than one site, then a deep link may be established for each listed site in sequential order until all navigation and programmed tasks are performed.

In one embodiment DLP 1019 may only establish a single deep link to one site and additional DLP modules may be required for establishing other deep links. In some secure environments a service site may require that a client machine be identified before allowing a secure transaction. Provision of an automatic deep link enables the client to automatically complete secure transactions of this type from his or her own machine in a transparent and efficient manner.

Figure 2:
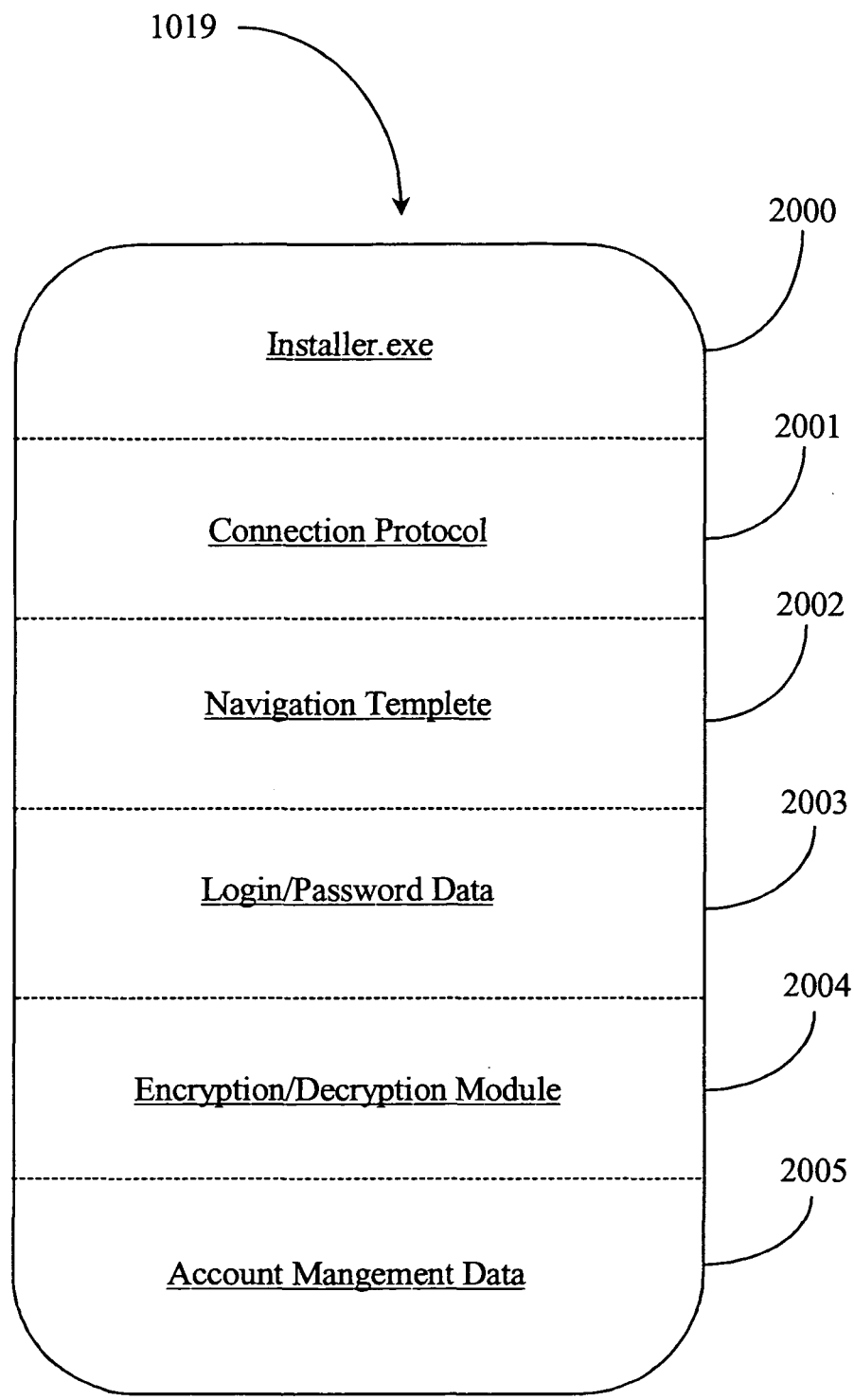
FIG. 2 is a block diagram illustrating components of a navigation plug-in used to establish one or more credential-based network links between a client and one or more services according to an embodiment of the present invention.

FIG. 2 is a block diagram illustrating components of navigation plug-in 1019 of FIG. 1 used to establish one or more credential-based network links between a client and one or more services according to an embodiment of the present invention. Plug-in 1019 may be thought of as a software module with several components. Plug-in 1019 has an installer exe. 2000 provided as a component thereof, which is adapted to enable a transparent automated installation to a client browser application.

Once a client has navigated to a provider site analogous to site 1005 of FIG. 1 and has accessed his or her personal Web page, he or she may select from listed billing parties and options to cause a download of one or more plug-ins 1019. Each download will be appropriate for the pre-configured actionable option or options the client has selected. Therefore, in one embodiment plug-in 1019 is automatically downloaded and installed based on a trigger event.

In one embodiment, a client may select from pre-configured plug-ins and download one or more based on desire or have them downloaded based on a trigger event. The installation and deep link initiation may still be performed in an automated fashion with client transparency to the process based on client instruction. For example, if a client downloads a "Pay Now" plug-in specific to one billing party, then the installation and establishment of a deep link between the client and the party may be automatic including performance of the transaction (Pay) while the client is still connected to provider 1005. In one embodiment, a client may elect to establish the deep link the next time he or she connects to the network instead of doing so at the current session.

In one embodiment, plug-in 1019 may be configured to execute within a specific time window such that if pre-loaded in a client browser, it will execute at the first opportunity within the window that the client has selected if the client connects to the network within the stated window of time. More particularly, it is possible that a client may download one or more plug-ins 1019 near the beginning of a payment cycle and that those plug-ins will each execute within a specific window of time during the client's normal network use activity. In this embodiment, notifications may be caused to pop-up at such times that transactions have been completed using a deep link regardless of the client's concurrent network location he or she is connected to at the time.

Plug-in 1019 has a connection protocol layer 2001 provided thereto and adapted for containing the protocol support modules for a particular client's preferred and configured connection methods and protocols used. For example, a plug-in might be configured to work with a particular TCP/IP connection used by a preferred browser instance. Likewise, the connection may be an Ethernet or other type of network connection using differing protocols. If a user employs a same browser application for browsing two differing connection types, it may be preferred that a deep link be established only when the default or chosen connection is active.

Plug-in 1019 has at least one navigation template layer 2002 adapted in a preferred embodiment, to contain the browser instructions for navigating to main and sub-domains of the target site or sites the plug-in is configured for. Navigation layer 2002 also may contain task instructions for navigating service options and performing tasks including subsequent navigation within a same domain or sub-domain.

Plug-in 1019 has a login/Password data layer 2003 provided thereto and adapted to contain and class any secure passwords, PINs, or other login codes needed by the navigation layer to gain access to services. Layer 2003 may also contain those secure passwords and/or PINs for securing access to source payment accounts held by a client and which are client-authorized as payment accounts that a service may access for receiving payment.

Plug-in 1019 has an encryption and decryption layer 2004 provided as a component thereof and adapted to provide encryption and decryption services for managing any secure data included as part of plug-in 1019. Such data may be securely stored on a client machine, in one embodiment, in decrypted format until it is necessary to retrieve and use the data for login or other secure process purposes.

Plug-in 1019 has an account management data layer 2005 provided thereto and adapted to contain any site management data such as form population data including secure personal information, and any other account data that may be required for submission during a transaction such as private account numbers, payment account numbers, and data that may be required in some instances for site searching, or other data input parameters that might be requested as part of a transaction process. In one embodiment plug-in data is embedded therein. However in another embodiment plug-in 1019 may access data physically stored in a client's machine memory or cache memory for retrieval during an execution of a deep linked session. In this case internal data paths to the data on the client machine according to a default file system may be appended automatically to the navigation sequence instructions if it is needed during a deep-linked transaction.

In one embodiment of the present invention if a client performs a deep link transaction to pay a bill or to perform another transaction, the results of that transaction performed may be saved and uploaded back over the first secure link established between the provider and a client as an update to client data currently displayable for the client at the provider interface. In another embodiment where a client may obtain a deep link plug-in and then go off line, and update may be provided at a next client login to the provider after a session has been conducted. In one embodiment to see whether a deep linked transaction has succeeded, the client may go back to his home page maintained on the provider server analogous to SVR 1013 of FIG. 1 and look for an indication that the transaction has been completed. Such an indication may be as simple as a dated balance shift resulting from a payment transaction made.

Plug-in 1019 may be provided as one download or as more than one download without departing from the spirit and scope of the present invention. Moreover, plug-in 1019 may be provided with additional or with fewer components than those shown in this example without departing from the spirit and scope of the present invention. Plug-in 1019, in this example, is illustrated with basic components although other types of components and configurations are possible without departing from the spirit and scope of the present invention.

Figure 3:
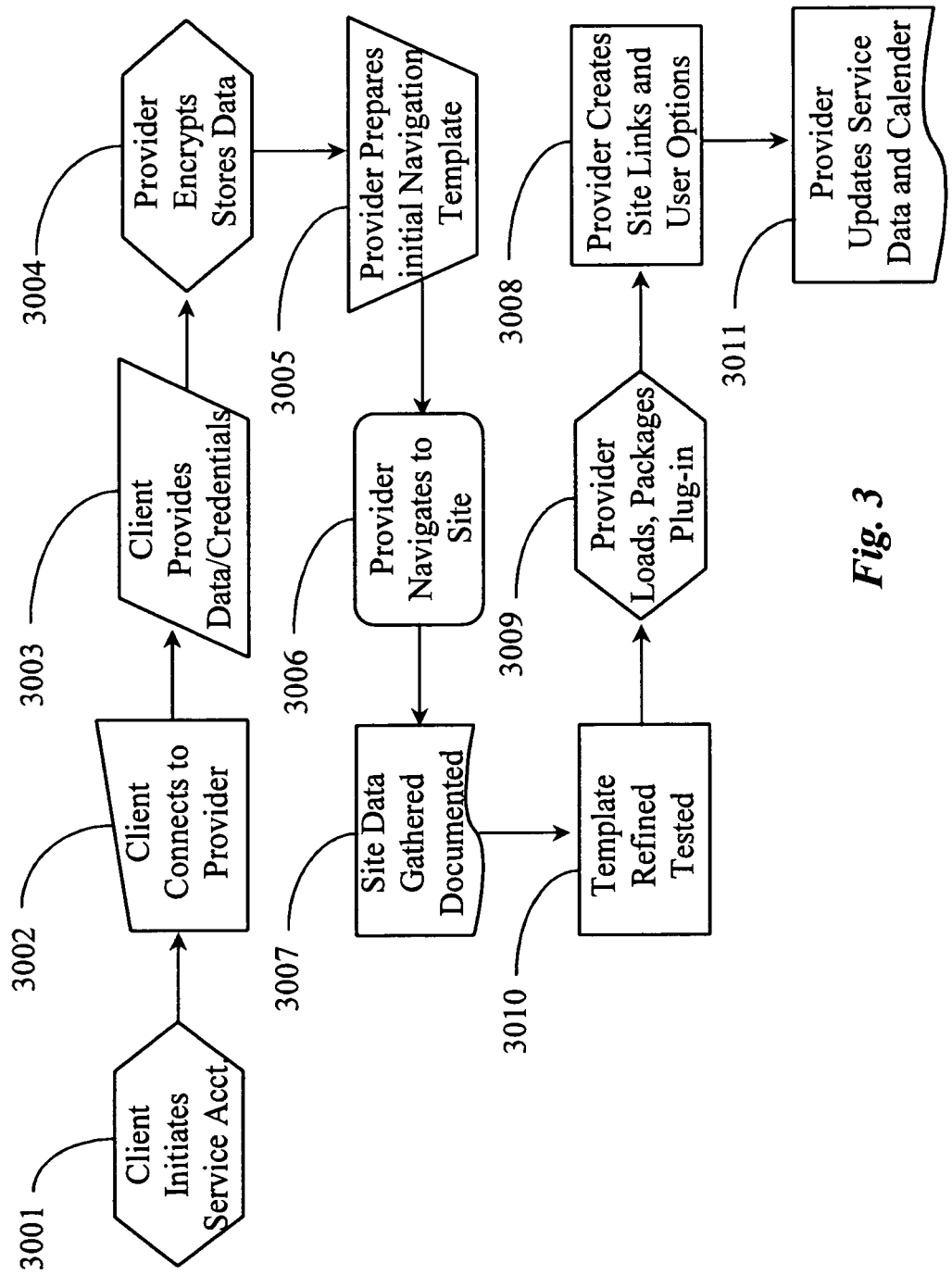
FIG. 3 is a process flow diagram illustrating steps for configuring a credential-based network link according to an embodiment of the present invention.

FIG. 3 is a process flow diagram illustrating steps for configuring a credential-based network link according to an embodiment of the present invention. At step 3001, a client analogous to client 1004 of FIG. 1 initiates an account with a billing party analogous to party 1003 also of FIG. 1. An example of such an account may be one set up for online transactions with a utility service companies Web interface.

Certain information becomes available resulting from the performance of step 3001. For example, the utility service now has secure payment account information for the client along with any login and password or code information the client uses to access the site and perform transactions such as paying a bill.

The client has certain information resulting from the performance of step 3001 such as the above-described password, PIN, or pass phrase/code data and URL link information and, in some cases downloaded controls that facilitate interaction with certain technologies that may be required in the server transaction method or process.

At step 3002, the client, after establishing an on-line account with a service, connects over the prevailing network to a provider analogous to provider 1005 of FIG. 1. At step 3003, the client provides data and credential-based information to the provider. Such data may include but is not limited to passwords, usernames, PINs, credit account information, payment account information, account numbers, and the like. In this step, the client may also provide a URL to the main site and any general information about which transactions the client may desire to perform at the site.

In a preferred embodiment, the client need only provide credential-based information and a main URL to register a direct billing service to the provider site. Data gathering may be employed to retrieve the service sites options and transaction procedures and the sub-domains hosting those options and procedures. In other words, provider 1005 may set up the rest of the plug-in for the client after the client has provided login information and credential-based data required to enter the site.

At step 3004, the provider encrypts the appropriate data transmitted thereto by the client over a secure socket layer (SSL) or other secure connection and stores the information on behalf of the client in encrypted format and associates the information to the pending inclusion of the service to the client's provider account. After step 3004, the provider has all of the required information to set up the service for deep linking. At step 3005, the provider prepares an initial navigation template from data supplied by the client. The initial template contains preliminary instructions for navigating to the main service page and for logging into that page using the client-supplied credentials.

At step 3006, the provider navigates to the main site on behalf of the client and logs in as the client. In a case where the service expects to identify a certain or specific machine to access the site using the credentials, the provider may, insert the correct machine information (provided by the client) into a required field, or in another embodiment, the client and service may be persuaded to turn off this feature if it is a block to the access of services. The latter embodiment is not preferred as in the preferred embodiment data gathering and site information gathering is performed transparently to the server.

In a preferred embodiment the provider navigates initially to the client service to gain additional data from the site at step 3007. Additional data may include account balance, account history, and billing schedule, so that the provider may notify the client independently from the client's service and may also provide summary information to the client in an independent manner.

In one embodiment, step 3007 also involves gathering site information about page layout and forms used by the service and further navigation information and rules for using the forms. Further, gathered information may include additional options provided normally at the service location, but that a client has not yet configured for use. In this case the provider site may provide that information independently to the client as well as provide navigation instructions in the form of a deep linking plug-in or portion thereof that may be successfully used by the client without prior navigation or task performance related to those additional features having been performed previously from the client machine.

At step 3008, the provider refines template navigation and task performance instructions used for plug-in components and tests them for successful navigation and task performance success. The testing can be performed in a modeled situation without actually navigating to the site and initiating any transactions that the client has not elected.

At step 3009, the provider loads and packages basic plug-ins that can be used by the client to initiate a deep link from the client machine to the service machine in order to pay bills and perform other transactions like changing payment account information, ordering a payment history, changing a credit card number, or even setting new passwords or PINs.

At step 3010, the provider creates a service entry for the client and creates available transaction options accepted by the service. Options may solely include payment of bills. In one embodiment other types of transactions that could otherwise be performed manually at the service may be included as options for deep-link transaction processing. The exact extent that the provider creates plug-in modules that can perform tasks other than what the client currently or routinely performs at the site may be based in part on client instructions or on enterprise discretion. For example, only a single option of "pay bill" may be provided for a client service, which a client may activate to trigger download and execution of the appropriate plug-in. However, the provider may inform the client that certain grayed out task buttons can be activated and already have basic plug-ins or plug-in options developed for them.

For a bill that varies in amount every payment period like a telephone bill for example, the provider periodically accesses the service site on behalf of the client and gathers the latest account information. The provider can make this information available to the client independently of the service site. Likewise, a plug-in for a task that may require some input by the client may be configured to prompt the client during run of the module for the input information such as a new password or username to replace an existing one. In one embodiment, the service provider may, if allowed by the client, create new password and username information for the client.

At step 3011, the provider periodically navigates to the site on behalf of the client and updates service data and calendar information for the client. Step 3011 is not specifically required in order to practice the present invention as a client may elect to receive payment and calendar information through traditional means and may navigate to the provider site just for the purpose of conducting transactions using deep linking technology.

Figure 4:
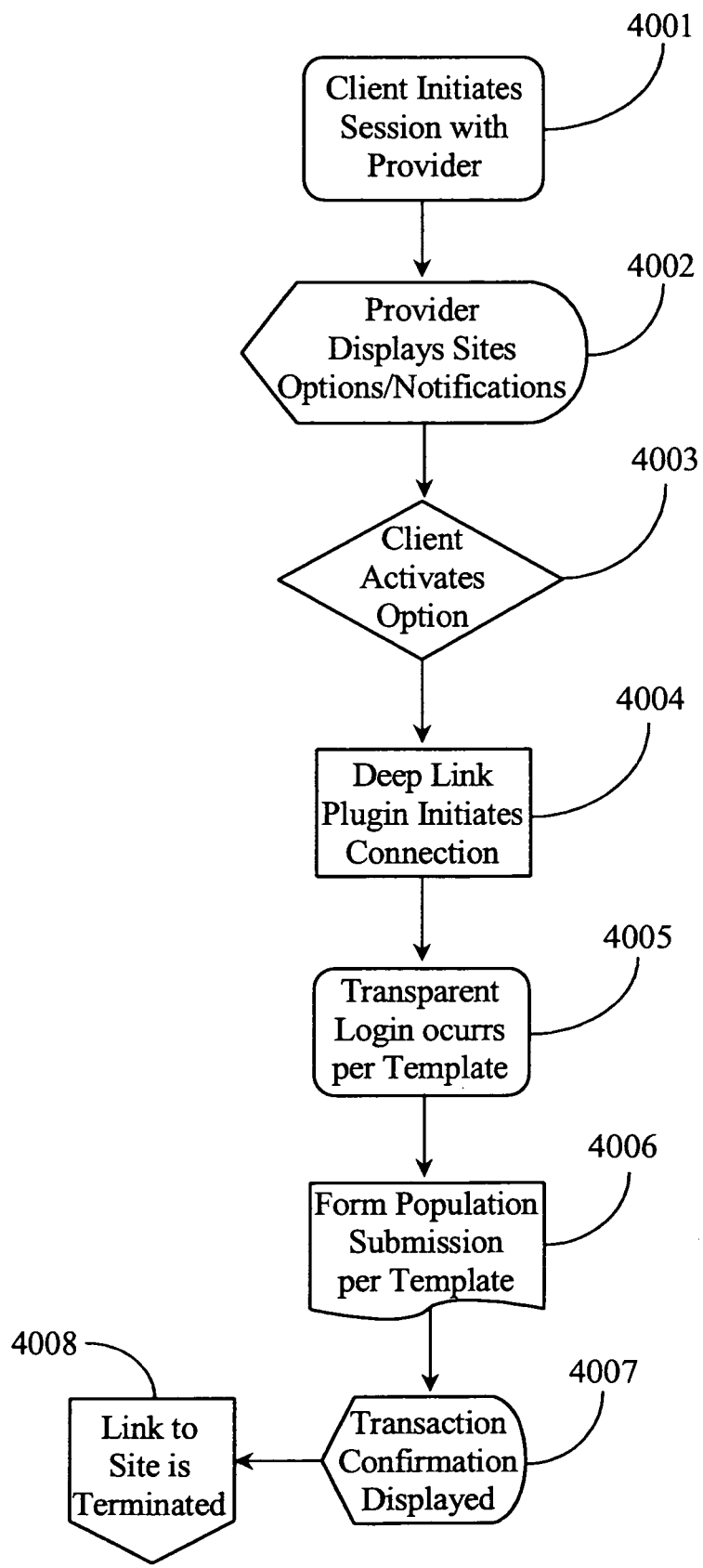
FIG. 4 is a process flow diagram illustrating steps for establishing and practicing a credential-based link according to an embodiment of the present invention.

FIG. 4 is a process flow diagram illustrating steps for establishing and practicing a credential-based link according to an embodiment of the present invention. At step 4001, a client analogous to client 1004 of FIG. 1 initiates a network session with a provider analogous to provider 1005 also of FIG. 1. The session may be an Internet Web session and the client may provide a password or PIN for authentication purposes.

At step 4002, the provider presents or serves a Web page personalized to the client. The served page may be an HTML page containing the clients listed billing party sites and associated available options and any notifications associated with those sites. For example, a utility company listing might be associated with an option "pay now" and a notification also associated with the listing might be a notification that a certain bill amount is now due. Such a notification may be provided in the form of a real simple syndicate (RSS) feed, a window pop-up, or a notification bar adapted for the purpose. Likewise notifications of bills due may be integrated with a dash-board style calendar that shows the days of the month wherein due dates, amounts, and billing party identification appear on the appropriate days of the month.

At step 4003, the client selects and activates at least one option related to at least one billing party. A likely option may be a pay now option associated with a single billing party for example. The action performed at step 4003 triggers an appropriate deep link plug-in analogous to plug-in 1019 of FIG. 2 to be immediately downloaded to the client over the existing network connection and to automatically install and execute initiating a deep link connection between the client and the related billing party server at step 4004.

At step 4005, the deep link is in a connected state and the any login procedures are automatically and transparently performed including navigation to a transaction page or form. At step 4006, the deep link plug-in automatically fills the appropriate form fields of an electronic transaction form provided by the billing party to enable the intended transaction. At this step, the deep link plug-in retrieves the appropriate data for form filing including the stated billing amount and source account information. The source account could be a credit account, a checking account, a pay-pal account, or another approved type of source payment account. Also in this step, the completed form is submitted by the deep link plug-in all transparently to the client.

At step 4007, the deep link plug-in may optionally display a notification providing resulting state of the just-submitted transaction. Such a notification may describe whether the transaction was successfully completed and whether payment has or has not been confirmed by the billing party. After successful confirmation, at step 4008, the deep link is terminated and the task is complete. The deep link session may be initiated and maintained in the background while the user is Web browsing the provider site or another site until the deep link is no longer required and step 4008 is performed. According to the nature of the client's source payment account information, a service may already have access to such an account as approved by the client. However in one embodiment the source account data may be provided to the service only during a deep linking session for a particular transaction. As such, account numbers, checking numbers, and any approval PINs, or other credential-based data as might be required can be provided by the plug-in during the session as the transaction ensues. The client may, if desired, change such account information at the site of the provider and the provider may then update a plug-in with the new payment information.

In one embodiment, a client may intervene in the process and take over manually if there is a reason to do so. For example, if a credit card has expired or otherwise is not accepted by the billing party, a notification thereof may prompt the client to manually enter a new or replacement card number and expiration date. If a client decided to intervene he or she may select an option provided in the browser toolbar or some other display location that may cause the deep link session to become visible in a separate window. At this point, the client may manually finish and submit the transaction and results of the transaction may be automatically collected and presented both to the client and to the provider site for updating purposes. There are many possibilities.

In one embodiment, the plug-in downloaded may contain data and instruction for establishing more than one deep link per session wherein a client may elect to pay all existing and due bills in one transparent "session" wherein notification at completion of each transaction and the establishment and termination of each of possibly several deep link sessions may be made visible to the client in some notification fashion. In this case, the plug-in would cover all of the billing sites listed and selected for "pay all". In another embodiment, the client may elect to pay some but not all bills or pay bills according to a time-frame window which when reached while the user is connected to the network, will cause the plug-in to execute and establish the deep link to conduct the transaction.

One with skill in the art will recognize that there may be more or fewer steps in establishing and practicing a deep link session for conduction one or more transactions without departing from the spirit and scope of the present invention. In a simplest embodiment, a plug-in for establishing a deep link to a direct billing parties Web interface may be written for just the one service account and may cover just one transaction "Pay Bill". That is not to say that more complex navigation and task management functions cannot be provided in one plug-in for establishing a deep link session between the client and a service site.

Additional transactional-based options can be studied and enabled as transactions other than bill payment such as, communication requests, changing of passwords, usernames, or other credential-based data, new account registrations, purchases, and other types of transactions which may be performed in addition to payment of bills using the methods of the present invention and without departing from the spirit and scope thereof.

Figure 5:
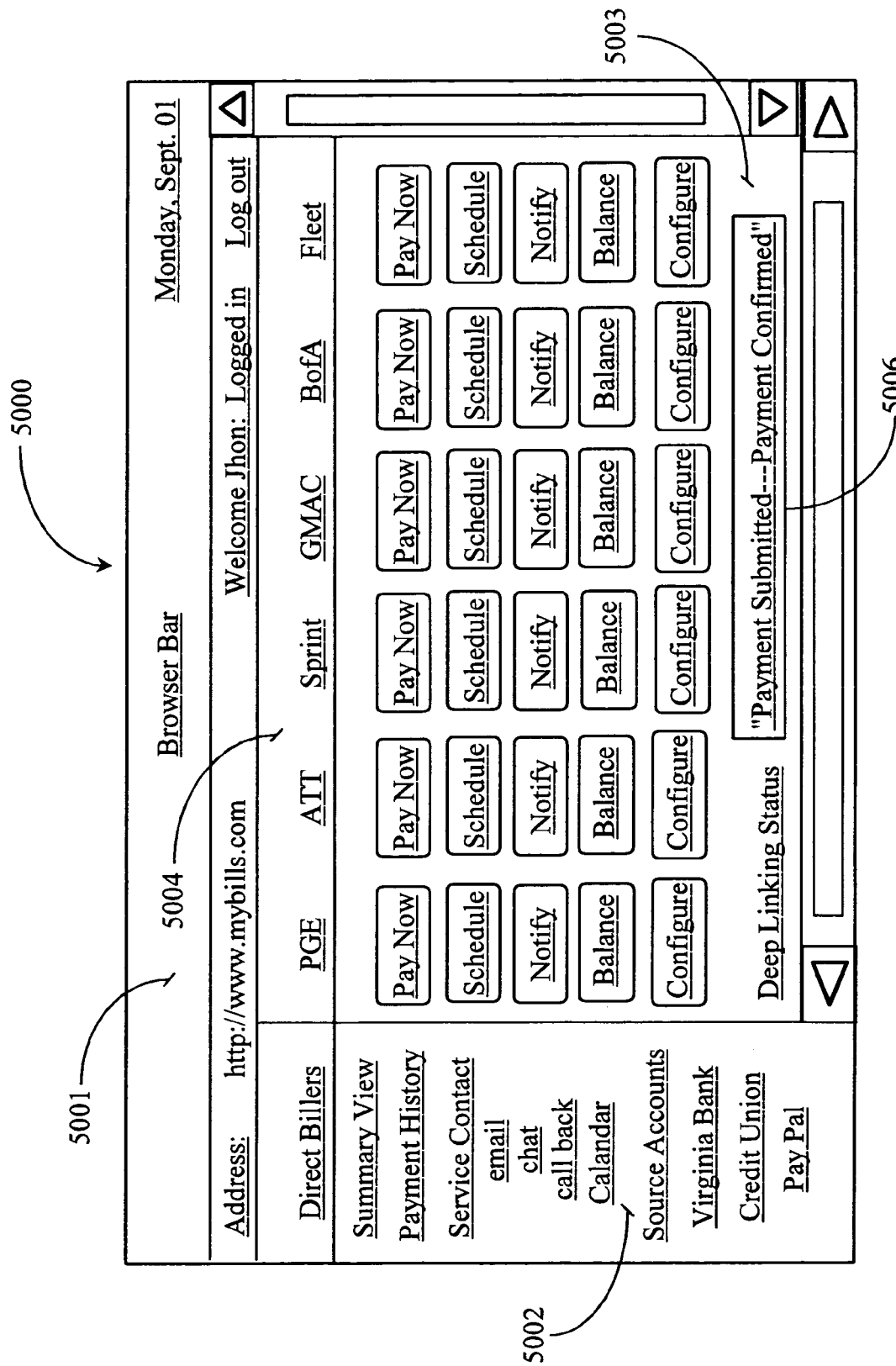
FIG. 5 is a block diagram illustrating a network interface page for listing a client's billing parties and options for interaction according to an embodiment of the present invention.

FIG. 5 is a block diagram 5000 illustrating a network interface page for listing a client's billing parties and options for interaction according to an embodiment of the present invention. Diagram 5000 represents a Web interface that may be provided to a client by a provider service analogous to service 1005 of FIG. 1. Interface 5000 may take the form of a browser window having a typical browser bar 5001, which would contain the typical browser icons adapted for normal Web browsing. An address bar, typical to Web browser applications is illustrated as part of interface 5000. The address shown, http://www.mybills.com is exemplary only and should not be construed as an actual address. A welcome note to a client, in this case, "Jhon" is illustrated as "logged in". Login may be accomplished by populating a previous username/password login screen (not illustrated) or other secure login page. An option for logging out is also provided.

Interface 5000 has a screen area 5004 provided therein for listing direct billing parties a client has registered with the service of the invention. In this case exemplary parties are listed as PGE, ATT, Sprint, GMAC, BofA, and Fleet. The actual listed names may be provided in the form of hyperlinks, which may be highlighted before selecting another option such as pay, or may be activated to cause navigation directly to the service site if desired. It is noted herein that directly navigating to a service site is not associated with deep linking but may be provided as a convenience to clients.

Interface 5000 has an option window 5003 displayed therein and adapted for containing actionable option icons associated in this case, in columns, under each listed billing party. For example under the entry PGE, the options Pay Now, Schedule, Balance, and Configure. The same array of options is presented in columns under each listed billing party in this example. The Pay Now option when activated in association with a billing party may trigger an immediate download and installation of a deep link plug-in into the client's browser application. Once installed the plug-in may immediately initiate and establish a deep link to the billing parties Web interface and may perform login and transaction initiation and submission transparently to the client.

Immediately below the Pay Now option, the Schedule option may optionally be provided and adapted to enable a client to schedule a payment of a bill. By scheduling a bill payment associated with a billing party a client may be able to create a time window within which a downloaded and installed deep link plug-in may automatically execute and establish a deep link to the billing party at a first opportunity falling within the time frame established by the client.

Immediately below the Schedule option the Balance option may be adapted to produce a balance owed figure for a client such that when a bill becomes due the balance is accessible by activation of the balance icon. Optionally, the Configure option may be provided to enable a client to configure certain preferences like notification types and channels, or to enable a client to configure and change other account preferences, passwords, and so on.

A transaction status bar 5006 may optionally be provided and adapted to display the latest transaction status information and confirmation of a successful transaction for any listed billing entity. Transaction data may be viewed in one embodiment by highlighting one of the listed billing entities and then selecting "Latest Transaction". In this way the last confirmed transaction and transaction result along with the date and time the transaction occurred may be displayed. It is noted that real-time transaction status and confirmation may be accessible over a deep link between a client and a particular billing party during a deep link session wherein confirmation of a successful transaction appears in a pop-up window, information pane or some other mechanism of the client browser, perhaps provided with a deep-link plug-in.

In a case situation wherein payment confirmation status is not provided immediately during a deep link session, a client may access the provider site (interface 5000) and check for any information the site may have gathered for a client since a transaction by navigating and updating information on behalf of the client. In a case situation where bill payment confirmation is immediately available, or available during a same deep link session, and the particular session is running concurrently with a session between the client and the provider, then the provider may take advantage of the real-time information for updating account history and so on.

In one embodiment, a "Pay All" option may be provided within interface 5000 wherein activation thereof may trigger download of a deep link plug-in that will establish multiple serial deep-link sessions while the client remains connected to the provider. There are many possibilities.

In one embodiment, interface 5000 also contains a side bar pane 5002 wherein additional options may be provided, some of which may through activation thereof trigger download and initiation of a deep link. Reading from top to bottom in pane 5002, a first listed option, Summary View, may be provided and adapted to display a summary of all listed accounts registered for service at the provider site. A next option, payment history, may be adapted to display recent payment history for all or any of the registered accounts.

A next option Service Contact may be adapted to enable a client to establish a deep link to a service account for the purpose of initiating and submitting a contact request, which may be a chat request, an email request, or a request for a call back to a client telephone number. A deep link plug-in for a service request may prompt a client during or before download for contact information including channel preferences for correspondence. For example, if a deep-link plug-in is configured to initiate a chat request, first a deep link would be established and the chat request would be submitted. Notification could be provided when a contact agent has answered the request. At this time, the deep link session may revert to visual client control for the purpose of carrying out the chat correspondence. In this case, the login procedure and chat request submission is transparently performed and the client may engage in correspondence when the agent is present in the chat window.

In one embodiment, a Calendar option is provided in pane 5002 that may be adapted to enable a client to have a calendar view of bills due for any or all of a client's registered billing parties. In another embodiment, an option for viewing Source Accounts set up for bill payment may be provided that displays a client's listed accounts, in this case the exemplary accounts Virginia Bank, Credit Union, and Pay Pal account. In one embodiment, a user may add or delete source accounts or modify account information.

In a simplest embodiment only bill payment transactions are enabled through the provider interface and deep linking occurs when a client selects a payment action icon associated with one, some, or all billing parties registered. In this embodiment, one or subsequent deep link connections may be established by a downloaded plug-in that is already configured for navigation and payment instruction. In one embodiment, there may be an option for scheduling a deep link session, which may be established when a client is not specifically connected to the provider site, but still connected to the prevailing network.

One with skill in the art of bill consolidation and payment services will readily attest that the methods and apparatus of the present invention combine and provide benefits of bill consolidation services and direct billing service interaction in one interaction environment. The methods and apparatus may be practiced over an Internet network or another WAN network enabled with network communication protocols used between network nodes. Likewise, the enabling apparatus of the invention may be provided as a series of machine-readable instructions downloaded as execution steps and interpreted by a resident client application capable of network navigation, or as a single packaged plug-in component that may automatically self-extract and install to an available client browser application without departing from the spirit and scope of the present invention.

Communication and Transaction Verification

According to another aspect of the present invention, the inventors provide a method and system for verifying state of a transaction comprising one or more communication sequences between a client and a service over a data packet network. The method and system is described in enabling detail below.

Referring now to FIG. 1 above it was described that client 1004 may, by providing minimally a URL and log-in information to provider 1005, have a deep link plug-in (DLP) 1019 established on his or her behalf by the provider. Client 1004 may download DLP 1019 from the provider and DLP 1019 may automatically install to client browser (BSR) 1009 and automatically execute if client 1019 has active connection to the prevailing network. Upon execution, DLP 1019 establishes a direct credential-based connection with a target server, in this case, Web interface (WI) 1016 within the domain of billing party 1003 for the purpose of carrying out one or more complete transactions with party 1003 such as payment of bills in a transparent fashion to the client and wherein automated log-in and authorization procedures, form filling and submission, and notification are performed without client participation required during the DLP session.

As was described within the background section of this specification, it is possible, especially with Internet shared bandwidth connection, that a session established with a service over the network by a client may experience problems such as loss of data or loss of connection entirely. In this case it may be that a planned task such as performing a transaction or setting up a new service account or service parameter may fail with no notice thereof available to or otherwise experienced by the initiating client. This may occur regardless of whether a session is a deep-link-session, or a session initiated and established by a client without the aid of provider 1005, which may be, as previously described, a bill consolidation and data aggregation service.

Figure 6:
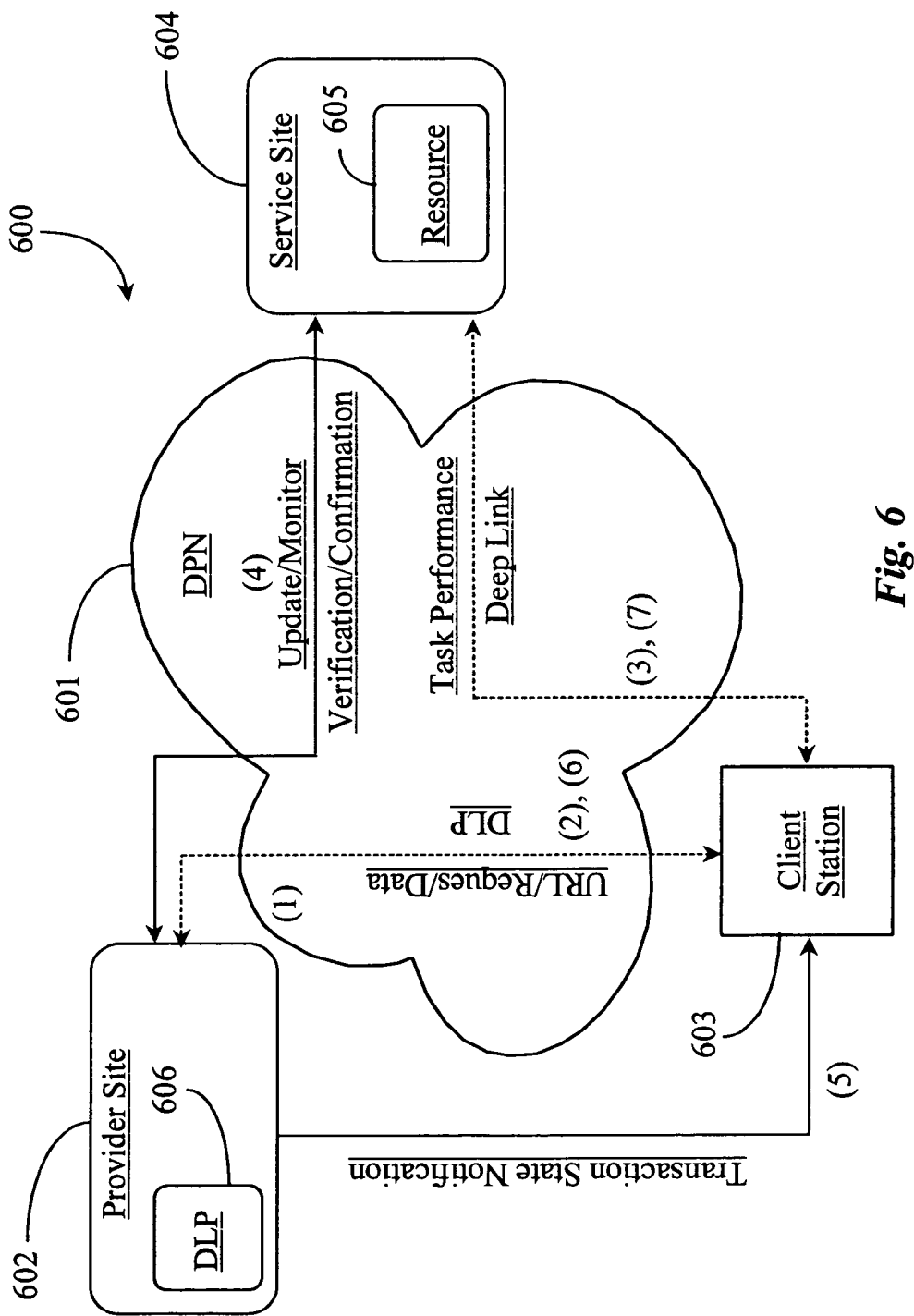
FIG. 6 is a block diagram illustrating logical connection architecture and steps for verifying state for verifying communication and authorization between a client and service over a data-packet-network according to an embodiment of the present invention.

FIG. 6 is a block diagram 600 illustrating logical connection architecture and steps for verifying state for verifying communication and authorization between a client and service over a data-packet-network according to an embodiment of the present invention. Diagram 600 may be logically compared with the architecture described with respect to FIG. 1 above. Diagram 600 encompasses a data-packet-network (DPN) 601, which may be considered, in a preferred embodiment, to be the Internet network. Therefore, DPN 601 may be referred to as Internet 601 in this writing.

Main entities comprising the connected parties for communication through Internet 601 include a provider site 602, which may be a bill consolidation service and data aggregator, a Client station 603, and a service site 604. Client station 603 may be analogous in description to client 1004 introduced with reference to FIG. 1. Service site 604 may be analogous in description to billing party 1003, also introduced with reference to FIG. 1.

Service site 604, which may in one embodiment be a direct billing party, has at least one resource 605 available to client station 603 over network 601. Resource 605 may be a Web page or a plurality of Web pages linked together and set up for clients like client 603 for the purpose of engaging with and interacting with a specific Web service or services that may be offered by site 604.

Provider site 602 has a DLP 606 and a DLP 607 illustrated within it's domain and it may be assumed that DLPs 606 and 607 are created for client 603 and may be downloaded by client station 603 for the purpose of establishing one or more deep-link-sessions between client 603 and site 604, perhaps to interact with resource 605 and complete specified tasks for the client.

In this example, it is assumed that resource 605 and service site 604 are already known to client station 603 and that the client has information of at least the main URL to site 604 and any password and/or log-in data required to gain network entry into site domain 604. In one embodiment, provider site 602 may be leveraged by client station 603 to register service site 604 for the client using a deep link method. More particularly to the present invention, the provider site can provide some verification of communication and transaction state to client 603 independently of service site 604.

Client station 603, at a step (1) may provide, minimally, a URL, a stated request for setting up a specific service or service parameter, and log-in data to provider site 602 under the assumption that provider site 602 has no current knowledge of service site 604 where related to client 603. The request may be a request to set-up and register one or more specified services made available to clients by site 604. The service or services may be in addition to any service or services a client may already have set up with site 604. Likewise client 603 may specify one or more requests for service configuration, perhaps leveraging resource 605.

DLP 606 may be an initial DLP created by provider site 602 enabling client station 603 to establish a deep link to service site 604 and perform any tasks related to request data sent to provider 602 from client 603 at (1). At step (2) DLP 606 may be downloaded to client station 603 at a next session between client station 603 and provider 602. Depending on the nature of the request of (1), DLP creation requires prior navigation and data gathering by site 602. In some cases, provider 602 will create DLPs that navigate to all available services of site 604 by default, in which case a client may simply select a DLP that is pre-configured for setting up a specific service.

However, some parameter and service-access protocol nuances may require that a special DLP be set up for a client, for example, additional authorization data may be required, or some new client data may need independent verification, or the like. In some cases, some service data such as a key or service-generated access code may be required to access a particular service after it is approved for a client. Therefore, there may be more than one DLP created and downloaded to a client in order for a client to register for, configure, and then to successfully interact with a new service, if that service is configured using a deep link. Likewise, any service-generated information may not be generated and sent to the client during a same network session. The information may not be immediately available and approval for use of service may even depend on an independent verification of some client-supplied data.

In this example, it is assumed that client station 603 is using provider 602 to both configure and register a service, and to enable service access and interaction all using deep linking. At step (3) client station 603 forges a connection to service site 604 and resource 605 using DLP 606 previously downloaded at step (2). Task performance and form population as well as task submission may be performed to conclusion all transparently to an operator of client station 603. At step (3), if any new authentication PINs or password information is required, DLP 606 may include a program for generating those on behalf of the client. Such authentication data choices may be pre-loaded into DLP 606 based on rules for selection provided by site 604 in reference to configuring resource 605.

It may be the case, even with a deep link, that some data loss or complete failure of connection causes an incomplete configuration. For example, it may be that service site 604 did not receive all of the required client data to successfully configure the client and register the client for use of resource 605. Depending on circumstance, the connection may have failed of suffered some anomaly without the client realizing it.

At step (4) provider site 602 may navigate to service site 604 using a navigation template created for the purpose any time after the deep link session (3) has terminated and may update state information on the communication activity that occurred during that session. At step (4) the provider may also verify the integrity of the communication that took place in the deep link session of step (3) and may also verify any forthcoming confirmation, including any service-generated data that comprises authorization for the client to begin using services. Step (4) may be conducted on a periodic basis on behalf of the client, that is to say step (4) may involve multiple sessions conducted over a time period. Firstly, provider 602 can confirm whether the session of step (3) was successful regarding complete receipt of all required data from the client. Secondly, provider 602 may verify that all data sent from site 604 to the client was actually transmitted.

At step (5), provider 602 may send notification of transaction state to client station 603 regarding the latest activity that occurred during the session of step (3). For example, a notification "task failed" and "re-establish session" may be provided via pop-up, instant message or personal notification window if client station 603 has connection with provider site 602. In one embodiment, provider site 602 may send email to client station 603 notifying the client of state of transaction related to the activity during the session of step (3).

Assuming no failures during the session of step (3), there still may be a period of time before client station 603 will be approved to access and interact with resource 605 or be rejected according to independent verification. Provider site may provide confirmation or rejection notification as soon as it detects that such activity has transpired with respect to the latest activity. Assuming that client station 603 is approved to access and interact with resource 605, provider 602 may create another DLP 607 adapted to enable the client to login to resource 605 and perform tasks related to that resource.

DLP 607 may be downloaded to client station 603 at step (6). At this point, DLP 607 has any new information, including any information generated by service site 604 to navigate to, login to and use the service of resource 605. At step (7), client station 603 forges a deep link session with service site 604 and resource 605 and performs the required tasks on behalf of the client. It is noted herein that in this example, the client was required to perform no manual navigation, page login or service configuration or registration either to register and configure resource 605 or to later use the resource to perform tasks. More particularly to the invention, in the event of failure at step (3), provider 602 is well equipped to provide timely notice thereof. Moreover, in the event of success at step (3), but eventual rejection of the client by service site 604, provider 602 is well equipped to provide timely notification thereof, and may additionally convey any other instructional data that may be appended to the rejection notice by site 604. For example, a client may be rejected for using a particular account to pay bills from because of a mistake made by the site hosting the account. In this case additional information may be instruction for the client to contact the account host and resolve the issue before attempting service registration and configuration again.

In one embodiment, DLP 606 is adapted with a built-in notification module that may notify the client if the plug-in was unable to complete its execution and run according to pre-programmed criteria. In this case, DLP 606 may re-execute from client station 603 at the next opportunity when the client is online.

Figure 7:
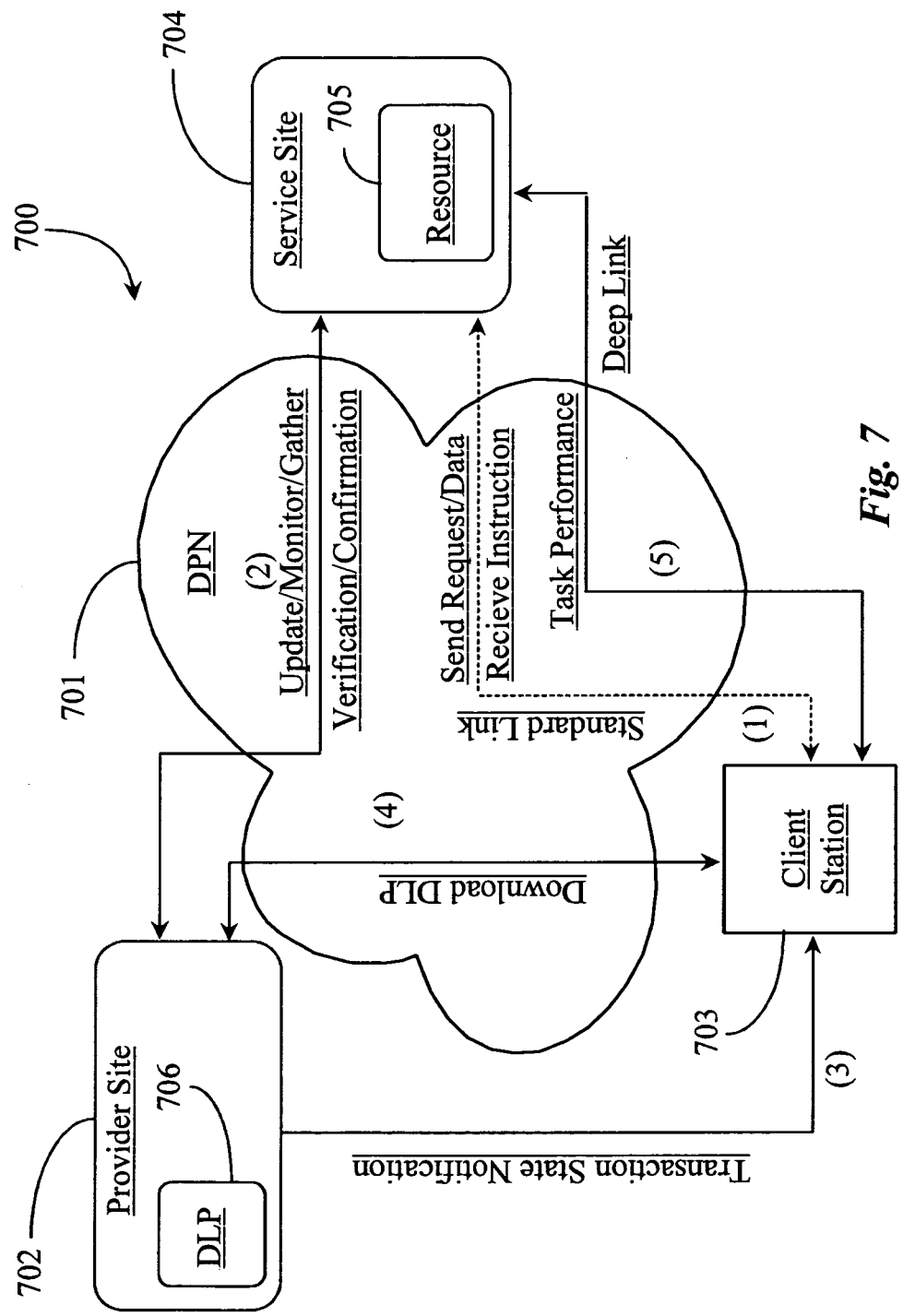
FIG. 7 is a block diagram illustrating the connection architecture of FIG. 6 and steps for verifying communication and authorization between a client and service over a data-packet-network according to another embodiment of the present invention.

FIG. 7 is a block diagram illustrating the connection architecture of FIG. 6 and steps for verifying communication and authorization between a client and service over a data-packet-network according to another embodiment of the present invention. Architecture 700 is analogous to architecture 600 described above including the presence of and description of the main components of the architecture. For example, DPN 701, provider site 702, service site 704, and client station 703 are all analogous to their counterparts of FIG. 6 although they have been given new element numbers in accordance with description of a new embodiment that differs somewhat from the embodiment of FIG. 6.

In this example, it is assumed that client station 703 already has set up main service site 704 with provider site 702 for at least basic access and interaction with minimally one service. Now assume that client 703 desires to add a new service, or modify an existing service. This may be as simple as changing payment account information by adding a new payment account to an existing service, or it may be that a new service is added that may require new account information before it may be activated.

In this case, client 703 accesses service site 704 in a non-transparent manner over a standard network connection forged between client station 703 and service site 704, or more particularly to resource 705 at step (1). This may be initiated without a deep link without departing from the spirit and scope of the present invention. In this case the client operating station 703 logs in to service site 704 and submits a request and the appropriate data related to the request. For example, the request may be to add a new bank account as a source account for bill payment and the data may be the account number, account host, routing numbers, balance information and so on. Additionally, service site 704 may require some data during interaction for security purposes such as social security information, and some personal information that verifies the client is the owner of the new account like pass phrase for account access, an account PIN or other information.

As was described above with reference to FIG. 6 step (3), the connection forged between client station 703 and service site 704 may suffer data transmission loss, data corruption, or complete connection failure during some point of the process of configuring services such that some data required for success is not received at site 704, is received but cannot be used, or some other anomaly that causes failure of the goal of the session at step (1).

It is assumed in this example that main service site 704 is registered with provider site 702 on behalf of client station 703, at least to an extent that provider site 702 may navigate to service site 704 on behalf of the client using a navigation template and client login data. Therefore, at step (2), provider site 702 navigates to service site 704 beginning at some point in time after the session of step (1) has terminated and the client is not logged on to service site 704.

Provider site 702, at step (2) may monitor site 704 for developments related to any latest activity initiated by the client, update any developments and gather any service-generated data such as a key, new password, or any other new data that may be required by the service for the client to access the newly configured or modified service. Moreover, provider 702 may verify not only success or failure of the communication sequence that took place at step (1), but may also look for any data related to eventual confirmation, or rejection of service access that may be dependent on independent verification results related to the client account involved.

It is noted herein that step (2) may be a repetitive step carried out periodically on behalf of the client for all registered service sites of the client that are at least minimally registered with provider site 702. During thee repetitive navigations and data gathering operations, any recent data exchanges, data states, and the like are scraped from site 704 on behalf of the client. The only time that provider site 702 may not access service site 704 on behalf of the client is if client station 703 is currently in session with service site 704. Likewise, client station 703 may not be able to access service site 704 directly if provider site 702 is in session with service site 704 on behalf of the client.

At step (3), provider site 702 may notify client station 703 of verification of communication sequence conducted during the session of step (1) including success or failure thereof. Also at step (3), provider site 702 may provide timely notification of approval or rejection of access to resource 705 by the client including any instructions appended thereto by service site 704.

Assuming successful configuration and registration of a new service related to resource 705 in service site 704, provider site may develop a DLP 706 for the client to use when accessing resource 705. It is noted herein however that client station 703 initiated the configuration and registration process without using a deep link and it is possible that the client created some authentication information, which was accepted during the same session. Because no deep link was used at (1), provider site 702 may be unable to gather some data at (2) if the data is accessible only through provision of the new authentication data, such as the use of 2 levels of security. Therefore, at step (3), the client may be required to provide the new security information to provider 702 before DLP 706 may be created. Otherwise, DLP 706 may be downloaded at step (4) to client station 703 in order to perform a task related to the new or modified service.

At step (5) client station 703 may forge a deep link to resource 705 at the next opportunity or according to pre-programmed time frame and may provide transparent navigation, form population and task performance transparently on behalf of the client, DLP 706 adapted to interact with the new resource configured at step (1).

Figure 8:
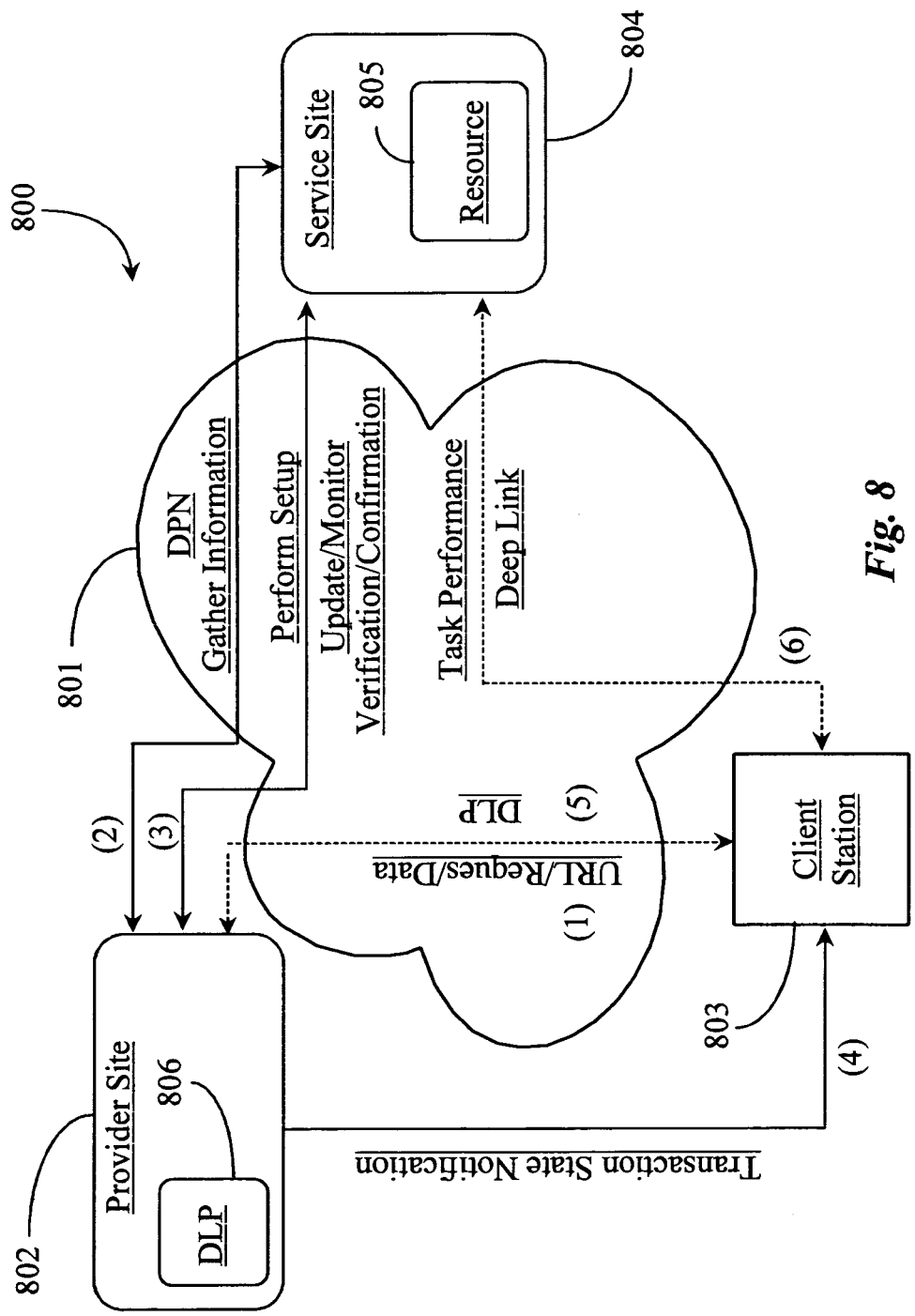
FIG. 8 is a block diagram illustrating the connection architecture of FIG. 6 and steps for verifying communication and authorization between a client and service over a data-packet-network according to yet another embodiment of the present invention.

FIG. 8 is a block diagram 800 illustrating the connection architecture of FIG. 6 and steps for verifying communication and authorization between a client and service over a data-packet-network according to yet another embodiment of the present invention. Architecture 800 is analogous to architecture 600 described above including the presence of and description of the main components of the architecture. For example, DPN 801, provider site 802, service site 804, and client station 803 are all analogous to their counterparts of FIG. 6 although they have been given new element numbers in accordance with description of another embodiment that differs somewhat from the embodiments of FIG. 6 and of FIG. 7.

In this example, service site 804 may or may not be initially known to provider site 802 as a client site of client station 803. At step (1) client station 803 forges a connection to provider site 802 and submits a main URL, a request for service access, and authentication data for login to service site 804. In one embodiment, provider site 802, having the URL and request data may register the client as a new client of service site 804 and may generate the required authentication information, including login parameters on behalf of the client.

In this example, the client is leveraging the navigation and data gathering capabilities of provider site 802 to completely set-up service site 804 and access to resource 805 for the client without any client involvement other than the request identifying the service desired and data relevant to the service that may be required in configuration such as a payment account identification, account number, account host identification, and any other parameters deemed necessary or that may be necessary. In one embodiment, provider 802 may already have some of that information if it is used in other services registered at the provider site for the client. In one embodiment, provider site 802 may provide a generic form to client station 803 for the client to enter data thereto that may be needed for typical service setup and activation.

At step (2), provider site 802 navigates to service site 804 using an initial navigation template created for the purpose from URL information provided at step (1) and gathers information from the site related to account and service registration and the parameters and requirements thereof. The information gathered at step (2) and the data provided by the client at step (1) is used to create an account including establishing a secure access to the site as a registered client. Specifically, the data gathered relating to site construction, service registration procedure, form use, form type, sub-domain navigation, and so on is used to refine the navigation template to prepare for navigating to, in this case, resource 805 and setting up service for the client.

At step (3), provider site 802 navigates again to service site 804 emulating the client and using the initial login data created during the session of step (2) begins a setup and registration procedure related to the original request. An example of a request may be to "begin an account for me at this music download service and enable me to pay my music download costs automatically using this credit account". In this case, provider site 802 may generate the secure login information that will be used subsequently to enter the members or registered users portion of the site, which may be a Web page personalized to the client. After initial login data is accepted and provider site 802 has logged in set up for registering for a specific service may continue in step (3). Many sites provide instant access once login and authentication data has been submitted and accepted.

In this case, the provider site is establishing the account and service access for the client and the session or sessions required to accomplish the task may suffer from loss of data, connection failure, or other anomalies that may cause a failure of a portion of or failure of the entire process. Because the provider site is using a navigation instruction and a set of instructions for setting up the account, the automated process may abort if some event such as connection termination occurs before the process is completed. The instance of software that is responsible for setting up the account may also contain an automated restart program if it has not executed and run to completion. Likewise, more than one restart program may be included and written into portions of the instruction where applicable. For example, where the instance is waiting for a server response and no response is given after a certain period of time, that portion of the instruction may be restarted.

Assuming that the session has failed for some reason or condition not controllable by the instruction set, then at step (4) the provider site may send notification thereof including instruction to client station 803. Perhaps some information provided by the client was not accurate and was rejected by the service site. It could be that the navigational template did not detect the problem in testing before actual execution of the navigation program.

Instruction to provide the correct form of the flawed data may be sent to client station 803 along with a failure notification at step (4). Otherwise, a successful registration may depend on some later verification or access approval by the service site as described further above. Therefore, at step (3) provider site 802 may continually or periodically monitor service site 804 for approval or rejection based on such verification. Periodic monitoring may be accomplished by initiating periodic connections to service site 804 to determine state of the transaction including existence of any service-generated data that may be required to actually interact with the configured service. At step (4) notification of when the client may access the site and interact with services may be provided based on the results of any independent verification process performed by service site 804 and detected during a monitoring session at step (3).

Once provider site has setup the account and specified service for client station 803, and service site 804 has accepted the client and has activated the service, a DLP 806 may then be provided that contains all of the necessary navigation instruction and data required to interact with the service according to the goals of the request. Using a music service as an example, DLP 806 may forge a connection between client station 803 and resource 805 at step (6), provide login, and provide task performance regarding downloading specific music titles from resource 805. The latter task may be pre-described in the initial request by filling out an electronic form detailing what type of music to look for and to acquire once the account is established. Such instruction may be specific to title and author, or it may be generic to genre and, perhaps be limited or constrained by a maximum number of titles that may be acquired per DLP session.

DLP 806 may also automatically perform credit account management during the session transparently to the client. For example, as a pre-paid credit allotment for pre-paid music expires, instruction for applying another credit using the client's credit account data may be executed to establish a next increment of credit for a next number of song titles to be downloaded. There are many possibilities.

In this example, the client had no visible involvement at all from the time of account establishment to first use of services accept for the initial request submitted to the provider site. Performing deep link tasks transparently for the client from the client's machine enables the client to perform other tasks simultaneously because manual task-performance input normally required during such sessions, such as select title and authorize download (music service) is not required. For a music session, if DLP 806 has not finished downloading the titles selected then the same DLP may resume where it left off at the next opportunity until all of the music has been downloaded and then may automatically authorize a next title package for the client according to any pre-configured constraints.

More particularly to the present invention, at step (3) and step (4) provider site 802 may discover on behalf of the client when an account has been activated and can provide timely notification thereof to the client. Likewise, any rejection or communication failure in account setup may also be communicated to the client, although in this particular example, provider site 802 handles the account set up and initialization from its own domain emulating the client.

Server-Side System

In another aspect of the invention a system is provided wherein transactions are accomplished with third-party sites on behalf of a client, and verified as having occurred, by a consolidation service without direct interaction between the client and the third-party sites.

Reference is now be made in detail to further embodiments of the present invention, being at least in part a method and system for verifying web-based communication with a third-party Internet-based service within a network, examples of which are illustrated in the accompanying drawings. While the invention will be described in conjunction with various embodiments, it will be understood that these descriptions are not intended to limit the invention to these embodiments. On the contrary, the invention is intended to cover alternatives, modifications and equivalents, which may be included within the spirit and scope of the invention as defined by the appended claims.

Furthermore, in the following detailed descriptions of the present invention, numerous specific details are set forth in order to provide a thorough understanding of the present invention. However, it will be recognized by one of ordinary skill in the art that the present invention may well be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Given the above, it should be borne in mind, however, that all of these and similar terms are to be associated with appropriate physical quantities and are merely convenient labels applied to these quantities. Unless specifically stated otherwise as apparent from the following discussions, it is appreciated that throughout the present invention, discussions utilizing terms such as "transmitting," "verifying," "generating," "navigating," "determining," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 9:
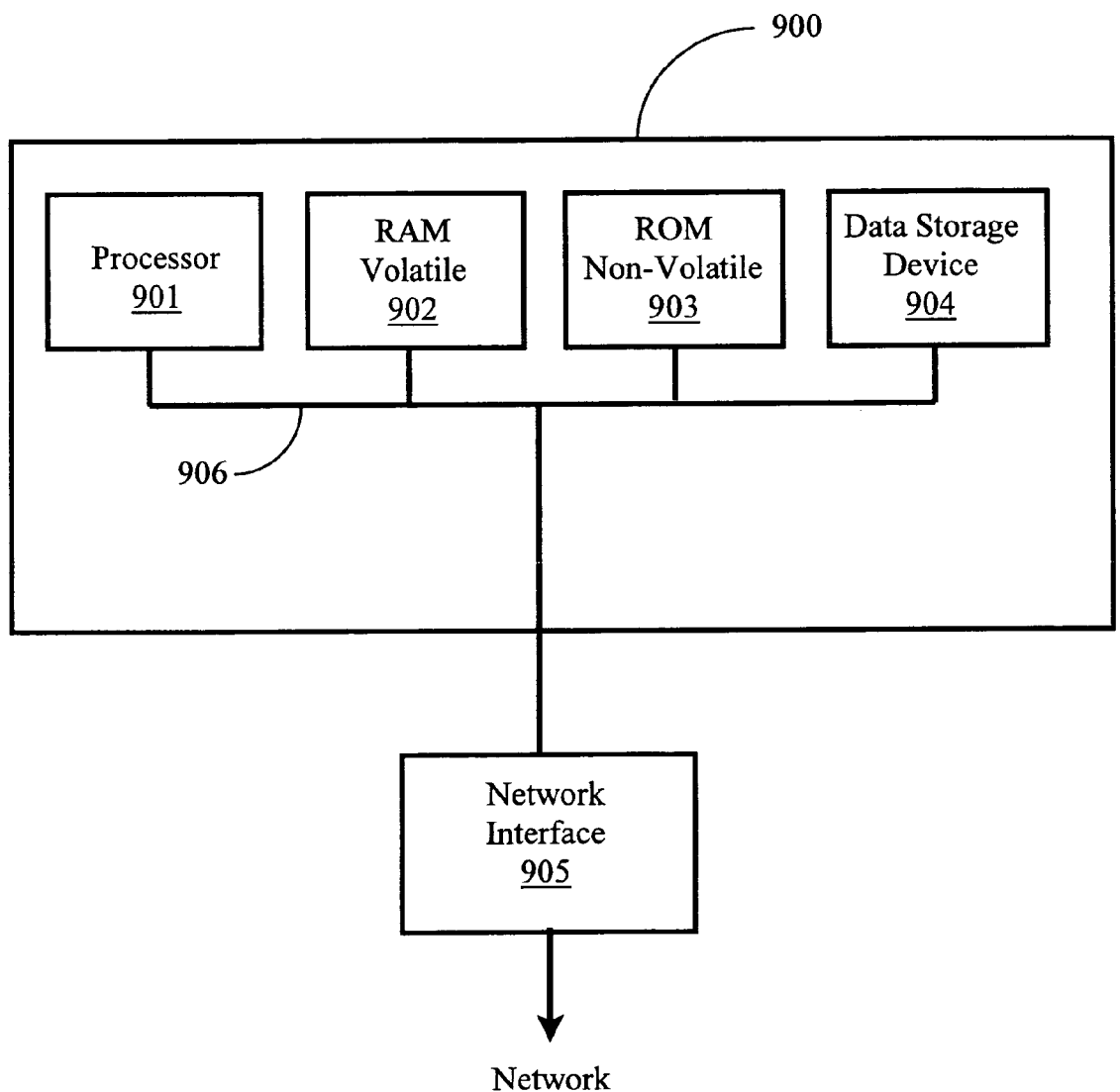
FIG. 9 illustrates a computer capable of functions according to embodiments of the present invention.

Referring now to FIG. 9, embodiments of the present invention comprise computer-readable and computer-executable instructions which reside, for example, in computer-readable media of a computer system that is capable of verifying web-based communication with a third-party Internet-based service within a network. That is, embodiments of the present invention can be implemented on software running on a computer system.

FIG. 9 is a block diagram of exemplary embedded components of such a computer system 900 upon which embodiments of the present invention may be implemented. The computer system can be an embedded system, a personal computer, notebook computer, server computer, mainframe, networked computer, handheld computer, personal digital assistant, workstation, and the like.

Exemplary computer system 900 includes an internal address/data bus 906 for communicating information, a central processor 901 coupled with the bus 906 for processing information and instructions, a volatile memory 902 (e.g., random access memory (RAM), static RAM dynamic RAM, etc.) coupled with the bus 906 for storing information and instructions for the central processor 901, and a non-volatile memory 903 (e.g., read only memory (ROM), programmable ROM, flash memory, EPROM, EEPROM, etc.) coupled to the bus 906 for storing static information and instructions for the processor 901. Computer system 900 may also include various forms of data storage 904 for storing information.

With reference still to FIG. 9, an optional signal input/output device 905 is coupled to bus 906 for providing a communication link between computer system 900 and a network environment. As such, signal input/output (I/O) device 905 enables the central processor unit 901 to communicate with browsers associated with clients that are coupled to the computer system 900, and with other network-connected equipment. The computer system 900 is coupled to the network (e.g., the Internet) using the network connection, I/O device 905.

Verification of Web-Based Communication

Accordingly, various embodiments of the present invention disclose a method and system for verifying communication over a network. As a result of such verification, reliable communication can be established between end-points within a web-based communication platform that may be unreliable, such as the Internet. Moreover, the process of communication verification allows for Internet services to automatically perform tasks on behalf of a client, such as, registering an account for an on-line billing service.

Figure 10:
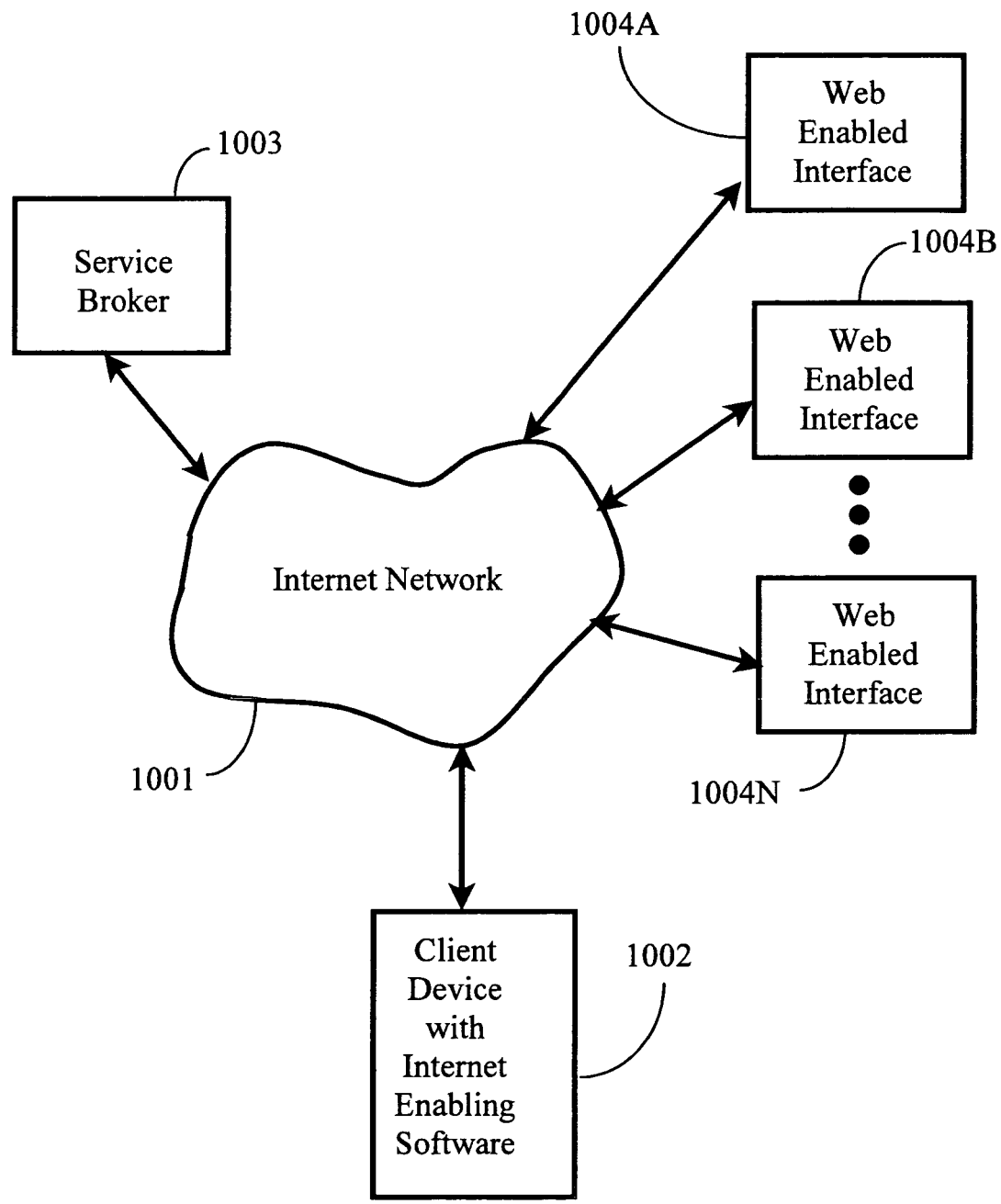
FIG. 10 illustrates a network configuration of computing systems for practicing embodiment of the present invention.

Referring now to FIG. 10, a block diagram of an exemplary communication network is disclosed that is capable of supporting the verification of web-based communication, or more specifically, communication with a third-party Internet-based service, in accordance with one embodiment of the present invention. In this way, for example, a service broker (e.g., a bill management service) is capable of verifying receipt of write transactions to the third-party Internet-based service, and of verifying authorizations by the third-party Internet-based service on behalf of a client.

The communication network in FIG. 10 comprises a client device 1002 or computer having an Internet enabling software (e.g., browser), the Internet network 1001, a service broker 1003 (e.g., bill management service), and a plurality of third-party Internet-based services 1004A-1004N that are coupled together through the communication network. The end-user via the Internet enabling software associated with client device 1002 and the Internet 1001 accesses the service broker 1003 to communicate with and utilize the services provided by the third-party Internet-based services 1004A-1004N. In this way, the service broker 1003 can perform tasks automatically that otherwise the client would have to manually perform. For example, in one embodiment, the client through the Internet enabling software associated with the client device 1002 and the Internet 1001 may access the service broker 1003 to set up a bank account for one of the web enabled interfaces (e.g., 1004A) to access for direct payment of bills by the client, or, for example, to initiate bill payment on behalf of the client.

In addition, the service broker 1003 may access each of the plurality of third-party Internet-based services 1004A-N through the Internet 1001 to aggregate information that is particular to the client associated with the client device 1002 having Internet enabling software (browser). For example, the service broker 1003 is able to automatically aggregate information from various resources (web pages) associated with a respective third-party Internet-based service to verify communication.

The Internet 1001, in general, includes a set of computer networks that are communicatively coupled together to enable the transfer of data between nodes within the Internet 1001. Communication is enabled through a common suite of protocols, such as, the transmission control protocol/Internet protocol (TCP/IP). Although the present embodiment is disclosed using the Internet 1001, other embodiments are well suited to deep-linking to a particular web page through any network, such as a LAN, or a wide area network (WAN), etc.

Figure 11:
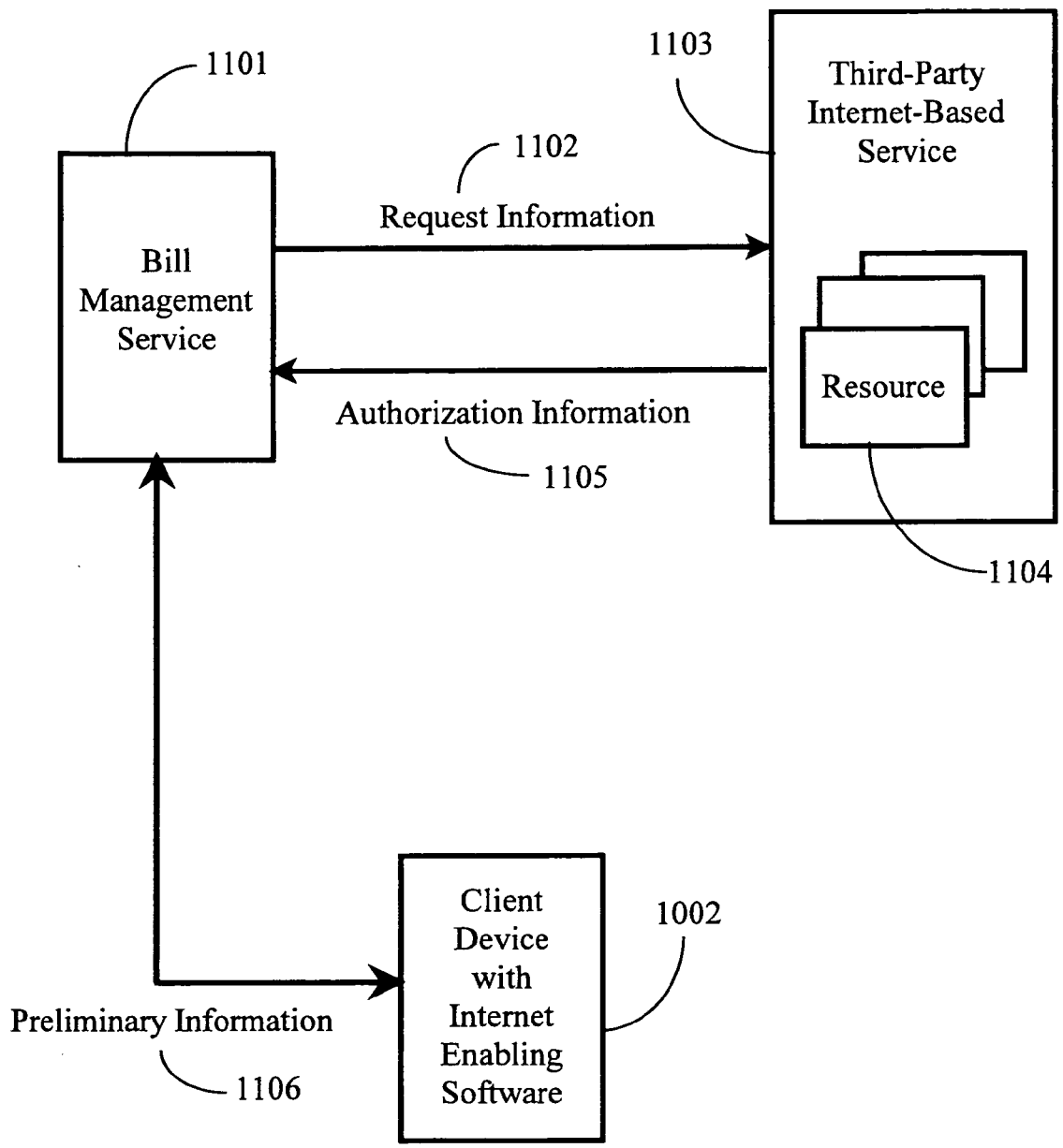
FIG. 11 is a schematic illustrating process flow in practicing the present invention in one embodiment.

FIG. 11 is a data flow diagram illustrating the functionality of a bill management service 1101 in verifying web-based communications with a third-party Internet-based service 1103, and verifying authorizations in response to write requests, wherein the authorizations are generated by the third-party Internet-based service 1103, in accordance with one embodiment of the present invention.

In the electronic billing environment, the bill management service 1101 is capable of using aggregation technology to leverage the existing services and information provided by a plurality of third-party Internet-based services, such as service 1103, to verify communication with those third-party Internet-based services. In particular, the bill management service 1101 is able to verify communication with the third-party Internet-based service 1103.

For example, the information that is gathered from the third-party Internet-based service 1103 may include other navigation information that outlines or is related to the infrastructure of the third-party Internet-based service 1103. In that way, relationships between specific information that is associated with a specific resource 1104 in the third-party Internet-based service 1103 may be gathered and sent to the bill management service 1101. For example, the specific resource 1104 may provide information that determines if communication was received by the third-party Internet-based service 1103, or if authorization or acknowledgement was generated by the third-party Internet-based service 1103.

More particularly, meta data gathered on the third-party Internet-based service 1103 by the bill management service 1101 provides specific navigation information to help the bill management service to navigate through the architecture of the third-party Internet-based service 1103 to that specific resource 1104. The navigation information may include a uniform resource locator (URL), list of web pages, cookie information, or other parameters that set up the infrastructure of the third-party Internet-based service 1104. A deep-link may be provided to help the bill management service 1101 navigate to a specific resource in a third-party Internet-based service, such as, resource 1104 of third-party Internet-based service 1103 for determining if communication was received, or if authorization was generated.

As a preliminary step, the client, through client device 1002 with an Internet enabled browser may submit a preliminary request 1106 to the bill management service 1101. Submission of the preliminary request 1106 allows the bill management service to handle the preliminary request 1106 for the client, the source of the request.

Moreover, the bill management service 1101 may edit or augment the preliminary request 1106 with client-specific information that is stored in or accessible to the bill management service 1101. In that way, the bill management service 1101 can automatically fill out write request information 1102 that is submitted to the third-party Internet-based service 1103 as the official request.

For example, the client may submit a preliminary request 1106 to the bill management service 1101 to set up a bank account with the third-party Internet-based service 1103 so that the client can pay bills directly on-line to the third-party Internet-based service that is a direct biller. As another example, the request may be to pay a bill with the third-party service. The preliminary request 1101 to the bill management service 1101 may only include the name of the third-party Internet-based service 1103, and the task, such as setting up the bank account or actually paying a bill.

Thereafter, the bill management service 1101 can take control of the transaction, and communicate with the third-party Internet-based service 1103 to set up the bank account or pay the bill. This is possible, since the bill management service 1101 has utilized its aggregation services to understand which resource (web page) and which procedures are necessary to perform the bank account set-up or to pay the bill; and also where and how to track receipt of the request, acknowledgement, or other information about the request after the fact of making the request.

As such, the bill management service 1101 can fill out the necessary request information 1102 for the client and transmit the request information 1102 to the third-party Internet-based service 1103. For example the request information can be that information necessary to enable the third-party Internet-based service to set-up the bank account to allow the client to pay bills online with the third-party Internet-based service 1103.

In one embodiment, the client associated with client device 1002 having the Internet enabling software has preliminarily provided the bill management service 1101 with the proper credentials to access the third-party Internet-based service 1103. The credentials are stored for access by the bill management service 1101. For example, the credentials may comprise user identification and user password necessary for access to the third-party Internet-based service 1103, in one embodiment.

Since the bill management service 1101 has the correct credential information associated with the client, the bill management service 1101 can act on behalf of the client to interact with the third-party Internet-based service 1103, in embodiments of the present invention. In this way, the bill management service 1101 can periodically access resources associate with the third-party Internet-based service 1103 to verify web-based communication, as is described below in relation to FIG. 12.

In particular, this process does not require the direct participation on the part of the direct billers associated with the plurality of third-party Internet-based services (e.g., service 1103) that are accessible by the bill management service 1101, in one embodiment. Nor does this process require any technology changes on the part of the direct billers from which billing information is aggregated. That is, any pre-existing third-party Internet-based service, e.g., web site, an open financial exchange (OFX) server, etc., is leveraged to provide verification of web based communication with those web sites.

Figure 12:
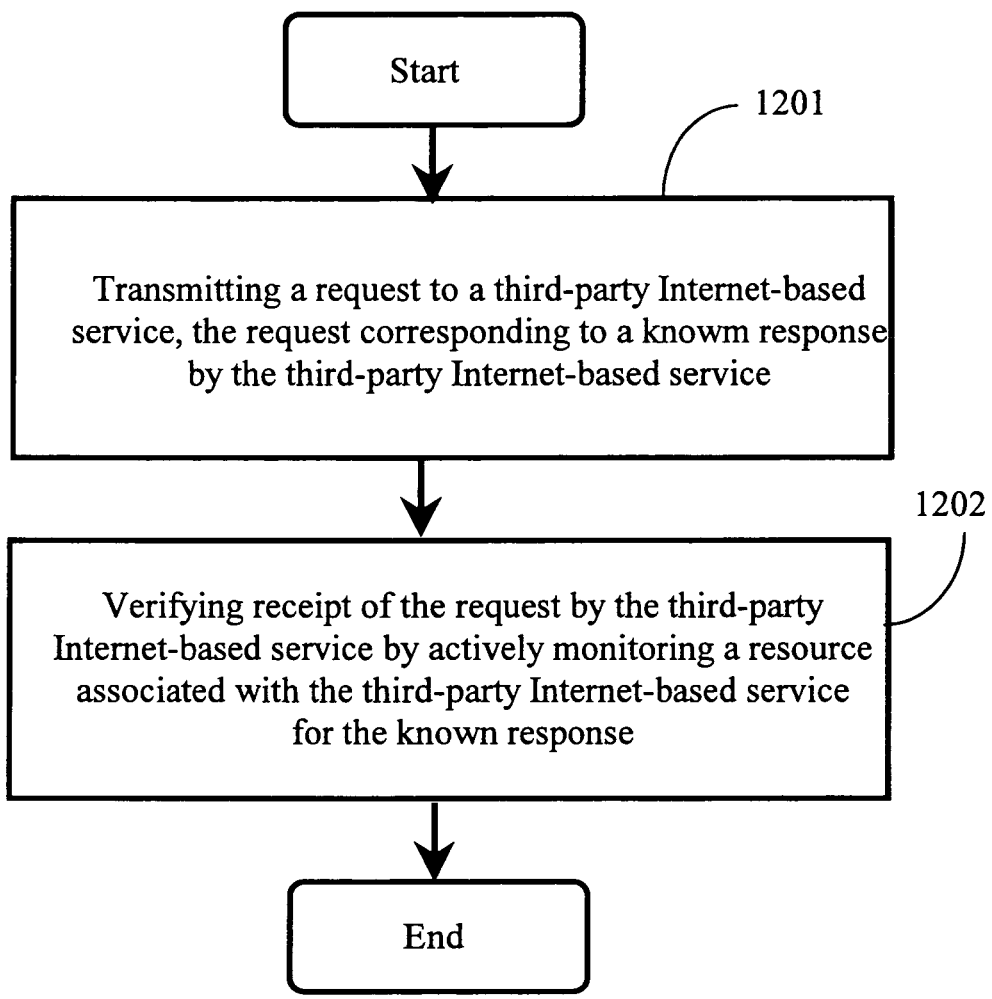
FIG. 12 is a flow diagram illustrating steps in a method according to an embodiment of the present invention.

Referring now to FIG. 12, a flow chart is disclosed illustrating steps in a computer-implemented method for verifying web-based communication with a third-party Internet-based service, in accordance with one embodiment of the present invention. As a result, reliable communication can be established between end-points within a web-based communication platform that is unreliable, such as the Internet.

The embodiment begins by transmitting a request to a third-party Internet-based service, at 1201. The request can be from a service broker, such as a bill management service to provide for automatic verification of web-based communication to the third-party Internet-based service (e.g., a direct biller) web site. The request is known in the art as a write request comprising write information that is submitted to the third-party Internet-based service, in one embodiment.

In another embodiment, the transmission of the request is in response to a preliminary request from a client communicating with the service broker through a client side Internet enabling software, for example, requesting such as a bank account set-up. Other embodiments are well suited to the transmission of the request directly from the service broker, or any Internet-enabling browser to the third-party Internet-based service for the purposes of verifying web based communication.

The request is of a certain format and type that is specific to the third-party Internet-based service. That is, the third-party Internet-based service recognizes a request that is made in the proper format. For example, the request, in the proper format, is recognizable by the third-party Internet-based service for requesting to set up a bank account so that a client associated with the request can pay bills on-line with the third-party Internet-based service.

In addition, the request corresponds to a known response that may be generated by the third-party Internet-based service. The known response can take on any recognizable form.

In one embodiment, the known response may be an active message sent to the bill management service that indicates that the request has been received.

In another embodiment, the known response is a passive message located within one or more of the resources (e.g., web pages) associated with the Internet-based service that indicates whether the request has been received. For example, the Internet-based service may have a user profile page associated with the client that gives the status of operations associated with the client, such as those operations associated with the request. As such, the user profile page may indicate in text whether the request has been received, in the following exemplary manner: "Received request for set-up." Also, the user profile page may indicate whether any action is being taken on the request, in the following exemplary manner: "Set-up in progress." In either case, the text indicates that the request was successfully received by the third-party Internet-based service and is being acted upon.

As such, the present embodiment continues by verifying receipt of the request by the third-party Internet-based service, at 1202. This is achieved by actively monitoring a resource, associated with the third-party Internet-based service, for the known response. That is, verification occurs when the present embodiment can determine that the Internet-based service has generated the known response.

The monitoring of the resource associated with the third-party Internet-based service can occur on a periodic basis until receipt is verified, or the monitoring has timed out, in which case, the third-party Internet-based service is assumed to not have received the request.

In order to actively monitor the resource for the known response, the present embodiment automatically navigates to the resource. This is possible, since the present embodiment utilizes aggregation technology to leverage the existing services and information provided by the third-party Internet-based services to locate the resource and to understand the known responses. In that way, the present embodiment is able to verify communication with the third-party Internet-based service.

As such, once the resource is located, the present embodiment parses information from the resource to verify or confirm whether or not the third-party Internet-based service has generated the known response.

In one case, the present embodiment determines that the third-party Internet-based service has not received the request by confirming that the third-party Internet-based service has not generated the known response. This determination occurs after a certain pre-defined time-out period. As a result, the present embodiment may retransmit the request to the third-party Internet-based service.

On the other hand, in another case, the present embodiment determines that the third-party Internet-based service has generated the known response. For example, the resource containing the known response may include text in the following exemplary manner: "Processing your set-up request." In this case, this indicates that the third-party Internet-based service has received the request to set-up the bank account so that the client can utilize direct billing services provided by the third-party Internet-based service. As a result, the present embodiment may inform the client originally submitting the request of the successful transmission of the request.

Figure 13:
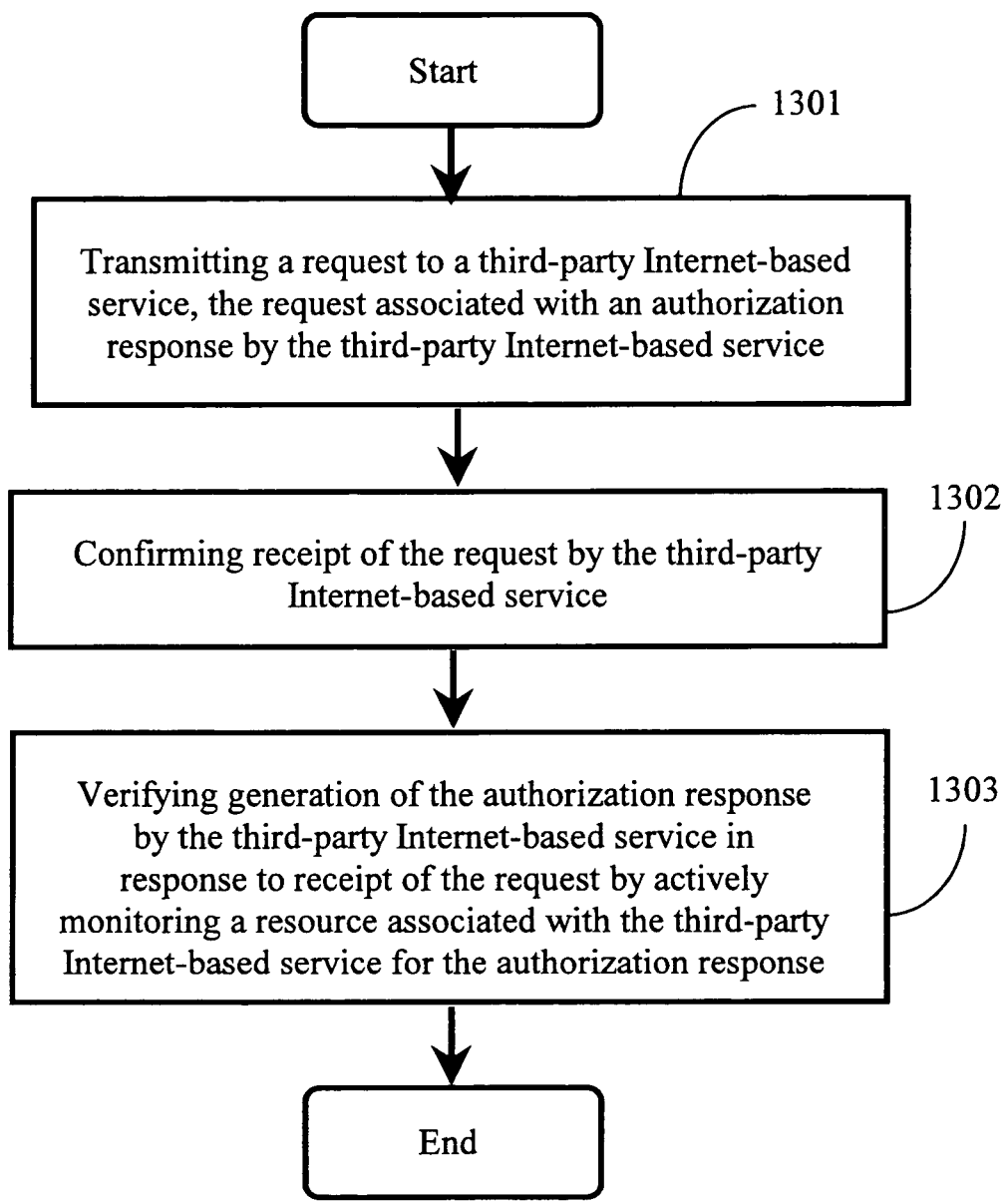
FIG. 13 is a flow diagram illustrating steps in another method according to an embodiment of the present invention.

Referring now to FIG. 13, a flow chart is disclosed illustrating steps in a computer-implemented method for verifying authentication over a network, in accordance with one embodiment of the present invention. As a result, the present embodiment allows for Internet services to automatically perform tasks on behalf of a client, such as registering an account for an on-line billing service and verifying the authorizing of the set-up.

The present embodiment begins by transmitting a request to a third-party Internet-based service, at 1301. The request is associated with an authorization response that is generated with the third-party Internet-based service. The request is site-specific, in that the format of the request is understandable by the third-party Internet-based service. Also, the authorization response is site-specific and known. That is, the authorization response is a constant and is used to respond to the request of the known format.

The request is associated with some action taken on the part of the third-party Internet-based service that provides an authorization by the third-party Internet-based service. That is, the third-party Internet-based service examines the request information provided in the request and makes a determination on whether to grant authorization or deny authorization to the client based on the request information. For example, the request may be to set up a bank account so that a client can utilize the direct billing services provided by a third-party Internet-based service (e.g., direct biller). The third-party Internet-based service may need to verify the bank account before giving authorization to the client to proceed with direct billing services.

The known authorization response can take on any recognizable form. In one embodiment, the known authorization response may be an active message sent to the bill management service that indicates the status of the authorization. In another embodiment, the known authorization response is a passive message located within one or more of the resources (e.g., web pages) associated with the Internet-based service that indicates whether authorization was granted or not. For example, the authorization response may be included within the user profile page, as described previously.

As such, the user profile page may indicate in text when authorization is granted, in the following exemplary manner: "Authorization to use account #XXX is granted." On the other hand, the user profile page may indicate in text when authorization is not granted, in the following exemplary manner: "Authorization to use account #XXX is not granted." Similarly, the user profile page may indicate in text review of the authorization, in the following exemplary manner: "Authorization to use account #XXX is pending."

At 1302, the present embodiment confirms receipt of the request by the third-party Internet-based service. Confirmation of the request may be performed similarly to the method provided in the flow chart of FIG. 4, as previously described.

At 1303, the present embodiment verifies generation of the authorization response by the third-party Internet-based service. This is achieved by actively monitoring a resource, associated with said third-party Internet-based service, for the known authorization response. That is, verification occurs when the present embodiment can determine that the Internet-based service has generated the known response.

The monitoring of the resource associated with the third-party Internet-based service can occur on a periodic basis until the authorization response is confirmed or verified, or the monitoring has timed out.

In order to actively monitor the resource for the known authorization response, the present embodiment automatically navigates to the resource. This is possible, since the present embodiment utilizes aggregation technology to leverage the existing services and information provided by the third-party Internet-based services to locate the resource and to understand the known authorization responses. In that way, the present embodiment is able to verify authorization provided by the third-party Internet-based service.

As such, once the resource is located, the present embodiment parses information from the resource to verify or confirm whether or not the third-party Internet-based service has generated said known authorization response.

In one case, the present embodiment determines that the third-party Internet-based service has generated the authorization response. As a result, the present embodiment informs the client, that is the source of the request, of the substance of the authorization response.

For instance, the authorization response may indicate that authorization is denied. In this case, the present embodiment would inform the client, that is the source of the request, that the authorization is denied. On the other hand, the authorization response may indicate that authorization is granted to the client. In this case, the present embodiment would inform the client of the successful authorization.

In another case, the present embodiment determines that the third-party Internet-based service has not generated the authorization response after a certain time out period. As a result, the present embodiment informs the client, that is the source of the request, that the third-party Internet-based service has not responded, and to take appropriate action, such as to contact the third-party Internet-based service.

While the methods of embodiments illustrated in the flow charts of FIGS. 12 and 13 show specific sequences and quantity of steps, the present invention is suitable to alternative embodiments. For example, not all the steps provided for in the method are required in all embodiments of the present invention. Furthermore, additional steps can be added to the steps presented in the present embodiment. Likewise, the sequences of steps can be modified depending upon the application.

Embodiments of the present invention a method and system for verifying web based communication is thus described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The methods of the present invention may be practiced over a data-packet-network of the form of an Internet network, an Intranet network, or another type of WAN either isolated from or having connection to an Internet network.

In view of the embodiments described herein and of those that are possible without departing from the spirit and scope of the present invention, the present invention should be given the broadest interpretation. The spirit and scope of the present invention should be limited only by the appended claims.

What is claimed is:

1. A computerized server connected to the Internet comprises:
 a service broker processor;
 a memory connected to said processor;
 the memory storing instructions that, when executed, cause the service broker processor to perform the steps of:
 storing credentials for a client in a data repository;
 receiving a preliminary request including a time for a transaction from a client computer;
 initiating the transaction at the time indicated in the preliminary request;

forwarding the preliminary request to a third-party service computer;
monitoring over the internet, multiple resources of the third-party service computer by:
(i) logging into the third-party service computer using the credentials of the client;
(ii) navigating through the resources of the third-party service computer at the third-party service computer; and
(iii) while navigating the resources, collecting and aggregating billing data of the client;
based on the monitoring, identifying an acknowledgement of receipt of the preliminary request for the transaction following the forwarding of the preliminary request; and
notifying, the client computer of the identified acknowledgement.

2. The computerized server of claim 1 wherein the service broker processor, through the data gathering and aggregation activity over the Internet, retrieves and stores navigational information regarding the third party service computer resources, which information is used in the monitoring for acknowledgement of the client's preliminary request.

3. The computerized server of claim 1 wherein, after a preprogrammed interval following the preliminary request, the service broker processor notifies the client computer regarding the occurrence of acknowledgement or of failure of receipt of the preliminary request.

4. The computerized server of claim 3 wherein the service broker processor, after the preprogrammed interval, having not identified the acknowledgement, determines the preliminary request was not acted upon by the third party service computer, and repeats the preliminary request on behalf of the client.

5. The computerized server of claim 1 wherein the third party service computer is a billing facility and the transaction included in the preliminary request is for a bill pay transaction at the billing facility.

6. The computerized server of claim 5 wherein the preliminary request is to pay a bill on behalf of the client.

7. The computerized server of claim 5 wherein the preliminary request is to set a billing account specified by the client to be paid automatically each billing cycle.

8. The computerized server of claim 1 wherein the service broker processor maintains a list of third-party service computers associated with the client, and other lists associated with other clients, and provides to individual clients regularly updated information regarding status of available services for individual clients, with a mechanism for the individual client to select third-party service computers and make preliminary requests to the service broker processor for initiating transactions with the selected third-party service computer.

9. The computerized server of claim 8 wherein individual ones of the third-party service computers are billing facilities, the lists provided by the service broker processor comprise billing status, and at least some of the preliminary requests made by clients are for transactions with individual ones of the billing facilities in regard to bills associated with the clients.

10. The computerized server of claim 9 wherein the service broker processor after initiating the transaction for the client, monitors resources at the third-party service computer for identification of the acknowledgement of receipt of the preliminary request.

11. The computerized server of claim 9 wherein the service broker processor after initiating the transaction for the client, monitors the resources of the third-party service computer in order to identify confirmation of completion, or error in completion.

12. The computerized server of claim 11 where the service broker processor, gathers tracking information from the resources for observed state from the third-party service computer.

13. The computerized server of claim 12 wherein the service broker computer, through data gathering activity over the Internet, gathers information for the lists provided to clients, and also through the data gathering activity retrieves and stores navigational information regarding location at the resources of the third-party service computers on the Internet which information is used in the monitoring for the acknowledgement.

14. A method for transacting in a network of Internet connected computer appliances performed by a service broker computer provided by software executing from memory of a computerized server, performing the steps of:
storing, by the service broker computer, credentials for a client in a data repository;
receiving, by the service broker computer, a preliminary request including a time for a transaction from a client computer including an instance of the software;
initiating, by the service broker computer, the transaction at the time indicated in the preliminary request;
forwarding the preliminary request by the service broker computer to a third-party service computer;
monitoring by the service broker computer, over the internet, multiple resources of the third-party service computer by:
(i) logging into the third-party service computer using the credentials of the client;
(ii) navigating through the resources of the third-party service computer at the third-party service computer; and
(iii) while navigating the resources, collecting and aggregating billing data of the client;
based on the monitoring, identifying, by the service broker computer, an acknowledgement of receipt of the preliminary request for the transaction following the forwarding of the preliminary request; and
notifying, by the service broker computer, the client computer of the identified acknowledgement.

15. The method of claim 14 wherein the service broker computer, through data gathering and aggregation activity at the resources, retrieves and stores navigational information regarding the third-party service computer resources, which information is used in the monitoring for the acknowledgement.

16. The method of claim 14 wherein, after a preprogrammed interval following the preliminary request, the service broker computer notifies the client regarding the occurrence of acknowledgement.

17. The method of claim 16 wherein the service broker computer, after the preprogrammed interval, having not identified the acknowledgement, determines the preliminary request was not received by the third-party service computer, and repeats the preliminary request on behalf of the client.

18. The method of claim 14 wherein the third-party service computer is a billing facility and the transaction included in the preliminary request is for a bill pay transaction regarding a billing by at the billing facility.

19. The method of claim 18 wherein the preliminary request is to pay a bill on behalf of the client.

20. The method of claim 14 wherein the service broker computer maintains a list of third-party service computers associated with the client, and other lists associated with other clients, and provides to individual clients regularly-updated information regarding status of available services for individual clients, with a mechanism for the individual client to select third-party services computers and make preliminary requests to the service broker computer for initiating transactions with the selected third-party service computers.

21. The method of claim 20 wherein individual ones of the third party service computers are billing facilities, the lists provided by the service broker computer comprise billing status, and at least some of the preliminary requests made by clients are for transactions with individual ones of the billing facilities in regard to bills associated with the clients.

22. The method of claim 21 wherein the service broker computer, after initiating the transaction for the client, monitors resources at the third-party service computer for acknowledgement.

23. The method of claim 22 wherein the service broker computer, through data gathering and aggregation activity at the resources, gathers information for the lists provided to clients, and also through the activity retrieves and stores navigational information regarding the third-party service computers, which information is used in the monitoring for acknowledgement.

* * * * *